US008937887B2

(12) United States Patent
Altberg et al.

(10) Patent No.: US 8,937,887 B2
(45) Date of Patent: *Jan. 20, 2015

(54) SYSTEMS AND METHODS TO PROVIDE COMMUNICATION CONNECTIONS

(71) Applicant: YP Interactive LLC, Wilmington, DE (US)

(72) Inventors: Ebbe Altberg, Mill Valley, CA (US); Scott Faber, San Francisco, CA (US); Ron Hirson, San Francisco, CA (US); Sean Vander Linden, Berkeley, CA (US); Paul G. Manca, Oakland, CA (US)

(73) Assignee: YP Interactive LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,188

(22) Filed: Mar. 25, 2013

(65) Prior Publication Data
US 2013/0242807 A1 Sep. 19, 2013

Related U.S. Application Data

(63) Continuation of application No. 11/668,881, filed on Jan. 30, 2007, now Pat. No. 8,437,256.

(60) Provisional application No. 60/764,719, filed on Feb. 1, 2006.

(51) Int. Cl.
*H04M 15/16* (2006.01)
*H04M 15/18* (2006.01)
(Continued)

(52) U.S. Cl.
CPC ..................... *H05M 15/09* (2013.01)
USPC .......... 370/259; 370/352; 705/400; 705/14.7; 705/14.72; 705/14.73; 379/114.01; 379/114.03

(58) Field of Classification Search
CPC . H04M 15/18; H04M 15/61; H04M 2215/68; H04L 29/0621; H04L 29/06387; H04L 29/06993

USPC ......... 370/229, 235, 236, 241, 248, 252, 259, 370/351; 379/111, 114.01–114.09, 114.28, 379/130–132; 705/1.1, 14.1, 14.15, 14.23, 705/14.37, 14.39, 14.4, 14.49, 14.51, 14.55, 705/14.65, 14.69, 14.7, 14.73, 26.1, 26.4, 705/26.41, 26.43, 26.44

See application file for complete search history.

(56) References Cited

U.S. PATENT DOCUMENTS 4,741,025 A 4/1988 Maruyama et al.
4,796,293 A 1/1989 Blinken et al.
(Continued)

FOREIGN PATENT DOCUMENTS

EP 1492318 12/2004
GB 2329046 3/1999
WO 0244870 6/2002

OTHER PUBLICATIONS

About IntellectExchange.com, retrieved Aug. 8, 2000, http://www.intellectexchange.com/About.asp, pp. 1-12.*
(Continued)

*Primary Examiner* — Omar Ghowrwal
(74) *Attorney, Agent, or Firm* — Kilpatrick Townsend & Stockton LLP

(57) ABSTRACT

Methods and apparatuses to provide communication connections for partners based on communication references assigned to entities maintained by the partners. In one embodiment, a method includes: receiving from a partner contact information of an entity; providing the partner with a real-time communication reference usable to at least initiate a request for a communication connection; and in response to receiving a request initiated via the real-time communication reference, providing a real-time communication connection between a requester and the entity using the contact information received from the partner.

17 Claims, 23 Drawing Sheets

(51) Int. Cl.

| | |
|---|---|
| *H04M 15/08* | (2006.01) |
| *H04L 12/14* | (2006.01) |
| *H04L 12/16* | (2006.01) |
| *H04L 12/26* | (2006.01) |
| *H04L 12/64* | (2006.01) |
| *G06Q 30/00* | (2012.01) |

(56) References Cited

U.S. PATENT DOCUMENTS

| | | | |
|---|---|---|---|
| 5,099,510 | A | 3/1992 | Blinken, Jr. et al. |
| 5,361,295 | A | 11/1994 | Solomon et al. |
| 5,373,549 | A | 12/1994 | Bales et al. |
| 5,436,957 | A | 7/1995 | McConnell |
| 5,483,352 | A | 1/1996 | Fukuyama et al. |
| 5,483,588 | A | 1/1996 | Eaton et al. |
| 5,539,813 | A | 7/1996 | Jonsson |
| 5,544,237 | A | 8/1996 | Bales et al. |
| 5,555,298 | A | 9/1996 | Jonsson |
| 5,559,875 | A | 9/1996 | Bieselin et al. |
| 5,608,786 | A | 3/1997 | Gordon |
| 5,619,555 | A | 4/1997 | Fenton et al. |
| 5,644,715 | A | 7/1997 | Baugher |
| 5,689,553 | A | 11/1997 | Ahuja et al. |
| 5,740,549 | A | 4/1998 | Reilly et al. |
| 5,841,763 | A | 11/1998 | Leondires et al. |
| 5,862,223 | A | 1/1999 | Walker et al. |
| 5,982,863 | A | 11/1999 | Smiley et al. |
| 5,991,394 | A | 11/1999 | Dezonno et al. |
| 6,131,085 | A | 10/2000 | Rossides |
| 6,223,165 | B1 | 4/2001 | Lauffer |
| 6,301,350 | B1 | 10/2001 | Henningson et al. |
| 6,529,946 | B2 | 3/2003 | Yokono et al. |
| 6,535,506 | B1 | 3/2003 | Narain et al. |
| 6,581,105 | B2 | 6/2003 | Miloslavsky et al. |
| 6,807,423 | B1 | 10/2004 | Armstrong et al. |
| 6,996,216 | B2 | 2/2006 | Brown et al. |
| 7,013,001 | B1 | 3/2006 | Felger et al. |
| 7,212,615 | B2 | 5/2007 | Wolmuth |
| 7,380,139 | B2 | 5/2008 | Tagawa et al. |
| 8,027,878 | B2 | 9/2011 | Wong et al. |
| 8,185,437 | B2 | 5/2012 | Altberg et al. |
| 8,437,256 | B2 * | 5/2013 | Altberg et al. ............. 370/235 |
| 2001/0032878 | A1 | 10/2001 | Tsiounis |
| 2001/0037205 | A1 | 11/2001 | Joao |
| 2002/0042823 | A1 | 4/2002 | DeBettencourt et al. |
| 2002/0107730 | A1 | 8/2002 | Bernstein |
| 2002/0136377 | A1 | 9/2002 | Stewart et al. |
| 2002/0191589 | A1 * | 12/2002 | Vassiliou ............. 370/352 |
| 2003/0050837 | A1 | 3/2003 | Kim |
| 2003/0063121 | A1 | 4/2003 | Kumhyr et al. |
| 2003/0086556 | A1 | 5/2003 | Welch et al. |
| 2003/0182187 | A1 | 9/2003 | Scoble |
| 2003/0220866 | A1 | 11/2003 | Pisaris-Henderson et al. |
| 2004/0019605 | A1 | 1/2004 | Keown et al. |
| 2004/0044571 | A1 | 3/2004 | Bronnimann et al. |
| 2004/0132436 | A1 | 7/2004 | Dupont et al. |
| 2004/0148351 | A1 | 7/2004 | Cotte |
| 2004/0218588 | A1 * | 11/2004 | Karamchedu et al. ......... 370/352 |
| 2005/0071239 | A1 | 3/2005 | Tormey et al. |
| 2005/0094621 | A1 | 5/2005 | Acharya et al. |
| 2005/0165666 | A1 | 7/2005 | Wong et al. |
| 2005/0187895 | A1 | 8/2005 | Paya et al. |
| 2005/0216341 | A1 | 9/2005 | Agarwal et al. |
| 2005/0220083 | A1 | 10/2005 | Takeuchi |
| 2006/0020883 | A1 * | 1/2006 | Kothari et al. ............. 715/513 |
| 2006/0031516 | A1 | 2/2006 | Kumer |
| 2006/0075104 | A1 * | 4/2006 | Kumer ............. 709/227 |
| 2006/0129458 | A1 | 6/2006 | Maggio |
| 2006/0184378 | A1 | 8/2006 | Agarwal et al. |
| 2007/0160035 | A1 | 7/2007 | Altberg et al. |
| 2009/0018912 | A1 | 1/2009 | Altberg et al. |
| 2012/0226547 | A1 | 9/2012 | Altberg et al. |

OTHER PUBLICATIONS

"Applying Technology News," Accounting Technology, p. 14, Feb./Mar. 1997.
"TriNet's 'Help Me, I'm Stuck' Internet Voice Button Services Pushes Web Pages to Online Users," Business Wire, Mar. 25, 1998.
allexperts.com, company information retrieved from http://www.allexperts.com, available at least by Apr. 9, 2000.
answers.com, company information retrieved from http://www.answers.com, available at least by Aug. 8, 2000.
Dalton, Gregory, "Rent-An-Expert on the Web," Information Week, p. 75, Sep. 6, 1999.
exp.com, Inc., company information retrieved from http://www.exp.com, available at least by Sep. 20, 2000.
expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Sterling, Greg, "Ingenio's Ether—Pay Per Professional Advice," Search Engine Journal, Mar. 3, 2006.
University of Texas—Austin, information on the Electronic Emissary Project retrieved at www.tapr.org/emissary, available at least by Apr. 9, 2000.
Wasik, Joann M., "Information for Sale: Commercial Digital Reference and AskA Services," Virtual Reference Desk, http://www.vrd.org/AskA/commAskA.html, Sep. 20, 1999.
Wieland, Heidi et al., "Expertcity.com Launches Premier Online Marketplace for Expert Services," PR Newswire, Aug. 30, 1999.
Business Wire, "Prodigy, Inc. Signs Long-Term Agreement to Use Accipiter AdManager for Online Advertising," p. 06020352, Jun. 2, 1997.
PR Newswire Association, Inc., "NetGravity Announces New Internet Marketing service for Advertising Agencies; Secures Top Ad Spenders as Initial Customers," p. 9993, Jan. 25, 1999.

* cited by examiner

SYSTEMS AND METHODS TO PROVIDE COMMUNICATION CONNECTIONS

The present patent application is a continuation application of U.S. patent application Ser. No. 11/668,881, filed Jan. 30, 2007, entitled "Systems and Methods to Provide Communication Connections," now U.S. Pat. No. 8,437,256, which claims priority to U.S. Provisional Patent Application Ser. No. 60/764,719, filed Feb. 1, 2006 and entitled "Systems and Methods to Provide Communication Connection," the entire disclosures of which are hereby incorporated herein by reference.

The present patent application is related to U.S. patent application Ser. No. 11/329,459, filed Jan. 10, 2006 and entitled "Systems and Methods to Provide Availability Indication," now U.S. Pat. No. 8,125,931, and U.S. Provisional Patent Application Ser. No. 60/799,610, filed May 10, 2006 and entitled "Systems and Method to Convert a Free Call to a Fee-Based Call". The disclosures of the related applications are hereby incorporated herein by reference.

TECHNOLOGY FIELD

At least some embodiments of the present invention relate to user interface techniques to assist people to connect for real-time communication, such as connecting people for telephonic conversation, chat, document sharing, screen-sharing, etc.

BACKGROUND

Internet, cellular communication systems, television, newspaper, etc., provide diverse communication media channels through which people may receive information and/or communicate with each other.

People may use a web site to chronologically publish personal thoughts and web links Such a web site may be referred to as a blog. A blog may include content showing what is happening in the life of the person, collecting information on certain types of subjects of interest to the person, providing links to related web sites, etc. Thus, a personal web site may include a collection of contents that may be helpful to people of similar interest.

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet-switched network for a telephone connection. A packet switched network is typical in a computer data environment. Recent developments in the field of Voice over IP (VoIP) allow the delivery of voice information using the Internet Protocol, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

BRIEF DESCRIPTION OF THE DRAWINGS

The present invention is illustrated by way of example and not limitation in the figures of the accompanying drawings in which like references indicate similar elements.

SUMMARY

Figure 1:
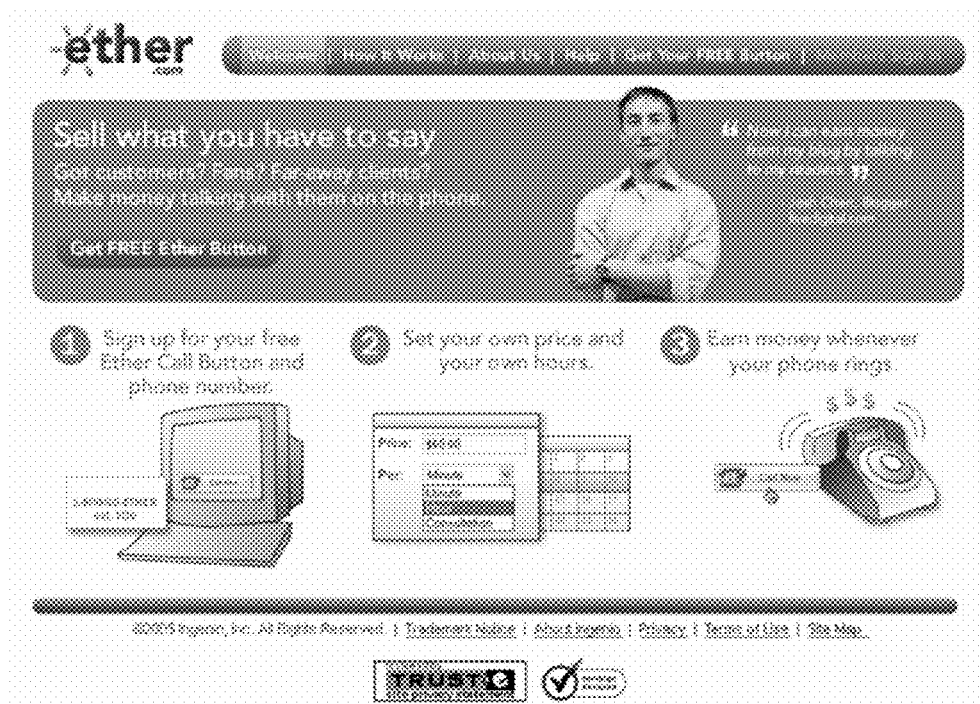
FIG. 1 illustrates a system according to one embodiment of the present invention.

Methods and apparatuses to provide communication connections for partners based on communication references assigned to entities maintained by the partners are described herein. In one embodiment, a method includes: receiving from a partner contact information of an entity; providing the partner with a real-time communication reference usable to at least initiate a request for a communication connection; and in response to receiving a request initiated via the real-time communication reference, providing a real-time communication connection between a requester and the entity using the contact information received from the partner.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description. References to one or an embodiment in the present disclosure can be, but not necessarily are, references to the same embodiment; and, such references mean at least one.

In one embodiment of the present invention, a system is to provide services to people who wish to make connections for real time communication, such as live telephone conversation, chat, video conferencing, instant messaging, and other forms of real time communications.

For example, benefits of the services may include anonymity for one or more of the parties of the real time communication. For example, the service can connect the caller and callee without revealing the contact information of one party to another, such as the actual telephone number. The services may include filtering callers/participants so that only those who are willing to pay can get connected. The services may include collecting payments for the callee so that the callee can earn money from talking to the callers over the phone without the burden of managing payment collection, etc. The services may include scheduling so that the real time communication are initiated at a convenient time (e.g., no night calls). The services may include queue managing to serve both the callees and the callers. The services may include providing the cool, convenient click-to-call functionality to attract callers for the callees.

In one embodiment, the services may include providing a persistent and consistent way to reach people. For example, a web link, or a toll-free number, or a local phone number can be provided by the system so that the callers can reach the callee using the web link, or the toll-free number, or the local phone number even after the telephone of the callee has been changed. The callee can publish the web link and/or the phone number, knowing that the calls will follow if the callee updates the telephone number in the system. The callees do not need to reveal their actual telephone numbers to the potential callers. If desired, the callee can keep the caller from knowing the actual telephone number of the callee for anonymity.

In general, the service may provide any combination of the benefits discussed above.

Many examples are presented in the context of telephone connection for real time conversation. Embodiments of the present invention can also be applied to other real time communication systems (e.g., text chat, instant messaging, voice/video conferencing, etc.) in a way similar to the telephone conversation.

FIG. 1 illustrates a system according to one embodiment of the present invention. As illustrated in FIG. 1, callees who have customers, fans, far-away clients, etc., can make money talking with them on the phone. The system provides the callees with services of managing the transactions such that the callees can sell what they have to say with reduced/minimum efforts on business aspects. For example, a blogger can earn money from the blog by talking to the interested readers of the blog.

In one embodiment, the callee can sign up for a call button of the system and/or for a phone number provided by the system. The call button and/or the assigned phone number can be used as the contact information of the callee. For example, the callee can publish the call button and/or the phone number in a variety of media channels and environments, such as in the blog, in advertisements, in news articles, in column discussions, in business cards, etc.

In embodiment of the present invention, the callees manage their own distribution of the call button and/or the phone number, since the callees may have their unique ways to reach potential callers (e.g., through blogs, home pages, business cards, etc.). The callees can bring the call button and/or the phone number into the context where the customers of the callees are, such as their own web pages or blogs or business cards (e.g., via a phone number).

Alternatively, or in combination, the system may also help the callees to reach callers through presenting the call buttons and/or the phone numbers in marketplaces, such as online listings of services, advertisements embedded in the search results generated by a search engine, classified advertisements, etc.

After signing up for the call button and/or the phone number, the callees can set up their own prices and their own hours for receiving the calls. When the call button and/or the phone number leads the callers to callees, the callees can earn money by talking to the callers without having to manage scheduling, queue, payment collection, privacy, etc. For example, the callees can enjoy the benefit of anonymity provided by the system, since the callees do not have to reveal their actual phone numbers to the potential callers in order to receive calls. The system provides the filtering functionality so that some callers can reach the callees.

In one embodiment of the present invention, the services of the system are packaged and delivered through the use of a call button and/or a communication reference (such as a phone number) assigned to the callee. The callees do not have to rely upon a marketplace, such as keen.com, to have callers reach them.

Figure 2:
FIG. 2 illustrates a user interface to create a listing according to one embodiment of the present invention.

FIG. 2 illustrates a user interface to create a listing according to one embodiment of the present invention. In FIG. 2, the callee can specify the rate the callee will charge the callers when the callers want to talk to the callee.

In one embodiment, the callee may specify the price (rate) in terms of a package, such as $100 for one hour. A call package has a specified price for a given time limit that is longer than one minute (e.g., one hour). Alternatively, the callee may specify the price in terms of a price per unit of time, such as $2 per minute, without specifying a time limit.

In one embodiment, when the rate is specified as a package that includes a time limit (e.g., 60 minutes, two hours, etc.), the callee can further specify the policy for the continuation of the call beyond the time limit (e.g., $50 per 30 minutes thereafter, or end call, or no longer charge).

In one embodiment, the callee can specify that they'd like to offer the caller free talk time before the paid portion of the call begins. This free talk time can be used to determine whether the callee's skills can indeed meet the caller's needs and whether there is enough trust to warrant a paid transaction. The callee can specify whether the caller can talk for 1, 2, 3, 4, or 5 free minutes, or even a limitless number of free minutes until a paid transaction is signaled. A paid transactions could be signaled by the seller or buyer pressing the # key on their telephone keypad, for instance. In this example, a caller could call through to a callee's phone just like a normal telephone call, until the # key is pressed, when the caller is directed to a live operator or IVR flow in which his payment details are collected and the caller is automatically billed for the subsequent time he spends talking to the callee on the phone.

In the user interface illustrated in FIG. 2, the callee can specify the phone number (e.g., 415-861-6100) at which the system will call the callee when a customer wishes to speak to the callee. The phone number is used by the system to call the callee and make a connection to the customer. The phone number of the callee is not provided to callers (customers of the callee) for anonymity.

In one embodiment, the callee may specify a listing name (e.g., for this listing). The callee may create multiple listings with different rates, phone numbers, etc., in the same account. Optionally, the callee provide may further description and a photo (e.g., a photo of the callee) for the listing.

In one embodiment, the photo of the listing should be no larger than 70 pixel wide by 70 pixel high and should be in either GIF or JPEG format. Alternatively, the system may automatically convert the image uploaded from the callee into the appropriate size and format. However, it is understood that other sizes can also be used.

After the listing is created, the callee can select the button "Continue" to access the next screen for getting the call button.

In one embodiment, the web server of the system provides the callee with: a call button and/or a phone number, such as 1-800-GO-ETHER extension XXXX, after the callee finishes creating the listing. The call button and the phone number assigned to the callee are intended for the callee to place wherever a caller (buyer) will come across them. The phone number can also be a toll-free number without an extension or even a local number.

In one embodiment, the callee, or seller, uses the given phone number to initiate calls back to the caller, or caller. In this case, the callee becomes the caller and the caller becomes the callee. For instance, a seller could receive a voicemail from a buyer who would like some information and has left his phone number to be called. The seller could reach this buyer by first dialing his Ether number and into his Ether account, then bridging the call to the buyer by dialing his phone number into the IVR. When the buyer answers, the call is initially free, until the # key is pressed, which triggers the billing module collecting funds from the buyer and paying the seller. Alternatively, the buyer can provide his phone number to the connection provider, instead of to the seller in the voicemail. In response to the voicemail, the seller can ask the connection provider to bridge the call from the seller to the buyer. In one embodiment, the voicemail is maintained in the system of the connection provider in association with the phone number of the buyer. After a period of time, the buyer may optionally ask the connection provider to cancel the voicemail, or block the seller from calling back to the buyer. Alternatively, the voicemail can be left on the answer machine of the seller, or a voicemail service of the seller that is not under the control of the connection provider. The seller can identify the buyer by specifying the date and time of the voicemail, or a reference added by the connection provider to the voicemail.

For example, a golf pro provides great swing tips. The golf pro as a callee (seller) can put a call button on a blog, on a web page, in the footer of an email, etc. When people are reading the blog about golf equipment, they might think "I'm really interested in what this person has to say, I think I'll pay to talk to them live and ask them all my questions."

In one embodiment, the call button includes HTML (Hypertext Markup Language) code which contains a reference to the listing and one or more links to a server of the system. The HTML code can be inserted into the blog and/or the home page of the callee, or an email. When the HTML code is rendered in the browser of the caller (e.g., when the caller visits the blog or the home page of the callee, or when the caller views an email from the callee), the browser shows a call button which can be selected (e.g., through "clicking" on the call button using a cursor controlling device, such as a mouse, a track ball, a joystick, a touch screen, etc.) to request a phone connection. An example of the appearance of a call button includes an icon showing a telephone set and the text "call now", as illustrated in FIG. 1.

In one embodiment, when the call button is rendered, the appearance of the call button may include an icon, which when selected or activated can initiated a request for a real time communication connection.

Alternatively, the call button can be specified in documents in a format other than HTML, such as in an extensible markup language (XML).

In one embodiment, the call button can change its state depending on the state of the caller and/or callee. For instance, if the callee is already on a phone call with a caller, the button would indicate "busy," so that a second caller would see that the callee is already on a telephone. Clicking on the button in this instance would give the second caller the ability to get in line to talk to the callee. Or, in another embodiment, the second caller clicking on the button could give him the ability to join the call in progress.

In one embodiment, the call button can change its state depending on what the callee explicitly indicates. The callee could, for instance, tell the system, via a web form or telephone IVR, that he is currently "taking calls" or "not taking calls" or "offering video" or "offering chat" or "taking appointments" or taking "arranged calls" or "callbacks." He could indicate that he is taking calls and is "by my phone," indicating a heightened presence. Depending upon each of such states, the system would lead callers down different communication paths. If a callee is "by my [his/her] phone," the system might call the caller first, since it's highly probably that the callee will be available for his/her side of the connection. If the callee is simply "taking calls," the system might call the callee first, since he/she might be the more unlikely party to be available. Other communication paths include getting in line, joining a conference call, turning on a video connection, scheduling an appointment, entering into a chat session, etc.

Similarly, the golf pro can use the phone number for various offline media and other media. For example, if the golf pro writes a column for Golf Digest magazine, he can put the phone number that is assigned to him (e.g., Ether phone number) at the end of the column, such as 1-800-GO-ETHER, extension XXXX. The system can even provide him with a custom 800 number, such as 1-800-GOLF-PRO, rather than the extension to a generic 1-800-GO-ETHER number. For example, the column may include the following message: "Call me to talk about your own golf swing. Dial 1-800-GOLF-PRO. $100/hour." Alternatively, the Ether phone number can be a phone number local to a specific region of interest to the golf pro (e.g., having the same area code, or the same area code and exchange, as those in the target geographical area).

In one embodiment, the callee may request a phone number, such as "1-800-GO-ETHER" extension "YOU", which is specifically assigned to the callee (and/or the listing). The callee can publish the assigned phone number in the blog, home page, printed publications, brochure, or business card. The phone number may be given out during a TV or radio talk show, etc. When the assigned phone number is called, the call is first connected to a server of the system. The system can then call the callee and join the caller and the callee for real time communication.

Figure 3:
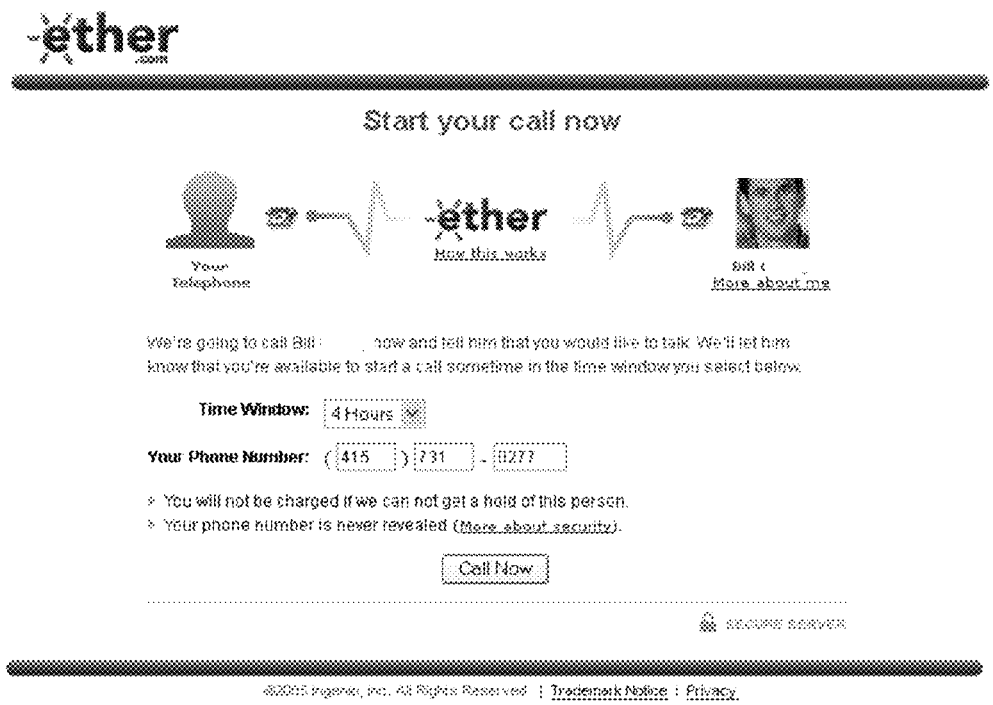
FIG. 3 illustrates a user interface to start a communication according to one embodiment of the present invention.

FIG. 3 illustrates a user interface to start a communication according to one embodiment of the present invention. For example, after a caller selects a call button, the user interface as illustrated in FIG. 3 is displayed (e.g., in the browser of the caller, or in a pop-up window).

In the example of FIG. 3, a call graphic is displayed to show the progress of making the connection. In FIG. 3, the photo of the callee (e.g., the photo uploaded by the callee to the server for the listing during the creation of the listing) is displayed with a link "More about me", which when selected causes the browser to display the description of the listing corresponding to the call button.

In one embodiment, when the photo of the listing is not available, the system may present a standard icon to represent the callee.

In FIG. 3, an icon and the description "Your Telephone" are displayed to present the caller. An "ether" icon between the caller and callee represents the system. The link "How this works" under the "ether" icon can be selected to see the details of the call process, which can be helpful to a user who is not familiar with the system.

The user interface presents an entry to receive a time window (e.g., 4 hours) within which the caller is available to take a call back from the system to talk to the callee. The user interface also includes an entry to receive the phone number of the caller such that the system can call back the caller to make the connection between the caller and the callee in this time window.

In one embodiment, the user interface can be part of the VoIP client application (e.g., the user interface of a VoIP terminal, such as the user interface of a VoIP-enable phone, or an application window of a VoIP application running on a computer or a Personal Digital Assistant (PDA)). The VoIP phone connection can be established, whether the user inputs the callback phone number or if the VoIP connection simply connects the two parties without the need of a phone number.

In FIG. 3, the user interface includes a button "call now" which when selected causes the user interface to send the time window and the callback phone number to a server to request for a phone connection.

In one embodiment, the user interface is part of the VoIP client application which can send the telephonic contact information (e.g., the phone number of the VoIP client application or a user ID of the VoIP system) to the server without the user explicitly specifying the call back number.

Figure 4:
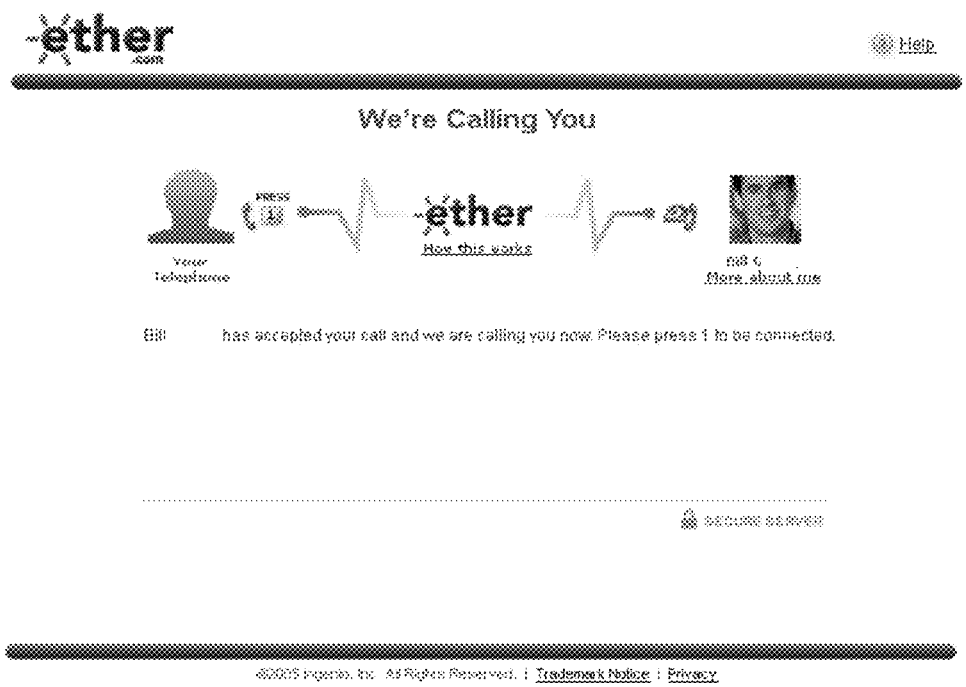
FIG. 4 illustrates a user interface to display the status of a communication connection process and to provide the user guidance through the process according to one embodiment of the present invention.

FIG. 4 illustrates a user interface to display the status of a communication connection process and to provide the user guidance through the process according to one embodiment of the present invention.

In FIG. 4, the call graphic shows that the phone of the callee is off the hook, indicating that the callee has accepted the call. The call graphic shows the icon "Press 1" to instruct the caller to press "1" on the phone to be connected to the callee.

The user interface further provides text explaining the status and instruction to the caller.

In one embodiment, before the callee accepts the call, the system calls the callee, during which the call graphic shows that the phone of the callee is ringing and the phone of the caller is on the hook, not yet answered by the callee. The text is provided in the user interface to explain the current status of the connection process and to instruct the user to wait while the system is contacting the callee.

Thus, in one embodiment, the system provides the user-friendly, step-by-step feedback and instruction to the caller to guide the caller through the connection process.

In one embodiment, after the connection between the caller and callee is established, the system further provides feedback and instructions on the call graphic. For example, during the call the system can provide the accumulated call time for the purchased call. If the purchased call has a time limit, the call graphic can further show the remaining minutes of the call. When the time limit is approaching (or reached), the call graphic can provide the guidance and instructions for "recharge" (e.g., by purchasing a further package, or switching to a per minute mode with a further time limit, etc.). In one embodiment, the options to continue the call when the time limit is approaching (or reached) is displayed in the graphical user interface so that the caller may select an option in the graphical user interface without interrupting the conversation with the callee.

In one embodiment, if a purchased call with a time limit is interrupted/dropped before the time limit is reached, the caller can continue the call by requesting a re-connection with a time window. To help the caller, the call graphic can present the guidance and instructions for continue the call and present the status of the continuation of the call. For example, the call graphic may present a description of the continuation policy for interrupted/dropped call and show the remaining portion of the time window to resume the call.

One example scenario of using a call button that is placed in the blog, home page, or email of the callee (seller) is described below.

When the callee (seller) is taking calls, the call button of the callee (seller) says "Call Me."

When the caller (buyer) clicks on the button, the caller (buyer) is led to a landing page that explains how the service works and indicates the price, which might be $100 to talk on the phone for 60 minutes and $1 per minute thereafter.

When the caller (buyer) clicks the "Continue" button on the landing page, the caller (buyer) is brought to a page to specify payment options (e.g., credit card information). Or, if the caller (buyer) is a returning member, the caller (buyer) can sign in (e.g., through providing the correct member name and password) to instruct the system to use the billing information (e.g., credit card and billing address) that is already on file (e.g., that has been previously submitted to the system and that is stored in the database of the system in association with account of the caller). If the caller (buyer) is not a member, the caller (buyer) is presented with a page to register with the system and become a member. Alternatively, the caller (buyer) may specify the payment information without becoming a member.

For example, the page may identify the caller (buyer) as a member according to the information provided by a cookie maintained by the web browser of the caller (buyer). If the cookie exists, the cookie includes the member name of the caller (buyer). If the cookie indicates that the caller (buyer) has already signed in, the server may skip the sign-in process; otherwise, the caller (buyer) is prompt to sign in. If the caller (buyer) is new to the network, the caller (buyer) is asked to register and become a member.

In one embodiment of the present invention, the call button/link does not bring the caller (buyer) inside the marketplace (e.g., a list showing competitors). Instead, the actions related to the call button happen in the environment of the callee (seller). For example, the web page(s) can be just a pop-up window so that the caller does not have to leave the web page (e.g., blog or home page) of the callee (seller). The landing page may be within a frame of the blog/home page of the callee, or within an applet embedded in the blog/home page of the callee.

Alternatively, the call button may bring the caller (buyer) to a VoIP application and provide the guidance and instruction to the caller on the user interface of the VoIP application.

In one embodiment, the VoIP application has browser functionality and shows the call button with the blog, web page or email in the user interface of the VoIP application.

Alternatively, the call button may bring the caller (buyer) to the marketplace which shows the offers of the competitors of the callee (seller).

In one embodiment, after confirming the payment information, the caller (buyer) is led to a page to specify the phone number that the caller (buyer) would like to be called back at and the time window within which the caller (buyer) is willing to receive the call back to talk to the callee (seller). The time window might be "four hours." FIG. 3 shows an example of such a page.

When the caller (buyer) continues (e.g., pressing the button "Call Now" in FIG. 3), the system obtains the authorization to charge an amount, when the call is connected (e.g., $100 from the buyer's credit card, if the credit card is the method of payment).

In one embodiment, a call for a package of bulk minutes (e.g., that has a specified time limit) is charged when the two parties are connected, regardless of whether the duration of the time limit is reached. In one embodiment, to avoid the difficulty in charging the buyer (e.g., $100) to talk to a seller but the seller fails to call back within the time window requested by the buyer, the system does not charge the buyer until after a connection between the caller (buyer) and the callee (seller) is successfully established (e.g., for a minimum period of time, or after the phone call is completed, or after the time limit is reached, etc.).

In one embodiment, the system "pre-authorizes" the charge (e.g., $100) on the buyer's credit card to make sure that, should the connection be completed, the buyer would be able to pay. In one embodiment, the system indicates the status of pre-authorization, charging/not-charging to the buyer in the user interface that guides the user through the process of making the connection.

Alternatively, the system may make the charge (e.g., $100) on the buyer's credit card when starting to make the connection and make a refund to the buyer if the connection is not successful within the call back time window specified by the caller (buyer). Alternatively, the system may charge a portion of the fee (e.g., $100) during the phone connection set up period, and refund the charge if the connection is not successful or charge the remaining portion after the connection is made successfully (e.g., after the phone call is completed).

In one embodiment, the system determines whether or not to pre-charge the buyer based on statistical data, such as the credit history of the caller (buyer), the success rate of the callee (seller) to call back within the time window specified by the caller (buyer), etc. Thus, for example, if the system determines that the call is likely to be established within the time window, the system may pre-charge the caller; for example, if the system determines that the caller (buyer) has a good credit history, the system may defer the charge to a later stage (e.g., after the completion of the call).

In one embodiment, after the system determines that the caller (buyer) has a sufficient source to pay for the call, the system calls the callee (seller) and says: "We have a caller who is calling you on your call button. He is paying your $100 fee and is willing to wait up to 4 hours to talk to you. Please press 1 on your telephone keypad if you want to take the call now; press 2 if you can't take it now but can indeed take it within the next 4 hours that has been requested, or press 3 if you won't be able to take it within 4 hours." Note that different system may associate different sets of key pressing events (e.g., press 1, press 2, press 3, . . . ) with different options.

In one embodiment, the system can optionally provide the callee (seller) with more information about the caller (buyer) based on pre-recorded information. For example, the system can record the self introduction of the caller (buyer) (e.g., the name of the caller, for instance 'Bob') so that the system tells the callee "We have 'Bob' . . . " instead of "We have a caller . . . ", where 'Bob' is the recording of the self-introduction of the callee (buyer).

In one embodiment, the system has the name of caller (buyer) recorded as part of the member preference/attribute of the caller (buyer). Alternatively, the system can use a text-to-speech program to "read out" the name of the buyer when introducing the call to the callee (seller). Alternatively, the system can record the name of the caller (buyer) when the system receives a call from the caller at the phone number assigned to the callee, or callback the caller first to obtain the recording.

In one embodiment, if the callee (seller) presses 1, the system tells the callee (seller) to hold on while the system calls the caller (buyer). The screen of the caller (buyer) is updated automatically to indicate that the callee (seller) is ready and the caller (buyer) is being called back for the connection between the caller (buyer) and the callee (seller).

If the callee (seller) presses 2, the system tells the caller (buyer) (e.g., on the screen of the caller) that the callee (seller) can't take the call now but expect to take the call within an identified period of time (e.g., the next 4 hours). The system will arrange to make the phone connection within the identified period of time (e.g., the next 4 hours).

In one embodiment, the system may use alternative numbers to indicate a response of the callee.

For example, the system may send a message (e.g., through email, a web-based user interface for the callee (seller), a voice mail, an instant message, etc) to the callee about the call and the identified period of time (e.g., 4-hour time window) so that the callee (seller) may indicate to the system within the identified period of time (e.g., next 4 hours) that the callee (seller) is ready for the call.

Alternatively, the system may try to call the callee (seller) periodically or according to a time period specified by the callee (seller). For example, the callee may press 15 after pressing 2 to indicate that system should try to make the connection after 15 minutes. Alternatively, the callee may provide such an indication through replying to the email, instant message, short text message, or through a network-based user interface (e.g., web-based) that is designed to manage the user account. For example, the network-based user interface may present a list of calls in the queue and the corresponding time windows. When ready to take the next phone call, the callee can indicate to the system that the callee is currently available to take a call (or a particular one of the calls in the list).

Alternatively, the caller (buyer) may try to call the callee (seller) again within the time window (e.g., next 4 hours).

In one embodiment, the system may monitor the activities related to this call to avoid duplicated efforts in making the connection within the time window (e.g., next 4 hours) so that the caller and callee are not interrupted by unnecessary attempts to make the connection.

If the callee (seller) presses 3, the system tells the caller (buyer) that the callee (seller) can't take the call within the requested time window. The caller (buyer) in this case is not charged the price (e.g., $100). In one embodiment, the caller (buyer) is charged the price (e.g., $100) only when the call between the caller (buyer) and callee (seller) is actually connected.

When the system makes the connection between the caller (buyer) and callee (seller), the system may call the caller (buyer) first or call the callee (seller) first, or call both at about the same time. For example, the system may determine which one of the caller and callee is more reliable and call the reliable one of the two first. The system may determine which of the parties is more reliable based on statistic data collected from past call connection activities. Alternatively, the system may connect to the less reliable party first. Alternatively, the callee (seller) may specify the preference of who is to be called first as part of the specification of the listing.

When the caller (buyer) calls the phone number assigned to the callee (assignee) (e.g., 800-GO-ETHER extension 4567), the system may first authenticate the caller and/or arrange the payment options and then prompt the caller to enter the time window and the call back phone number using the key pad of the phone. An interactive voice response (IVR) system can be used to interact with the caller so that the caller does not need web access to be connect to the callee (seller).

Alternatively, the system may determine automatically the telephone contact information of the caller from the call received from the caller (buyer) (e.g., through call ID service or an Automatic Number Identification (ANI) service) and use the telephone contact information in calling back. The system may present an option for the caller (buyer) to confirm the automatically detected telephone contact information of the caller for calling back so that the caller has an opportunity to specify different telephone contact information for the call back.

In one embodiment, when the system determines that the caller has a graphical user interface (e.g., web access) while requesting the connection for the call (e.g., when the caller pushes a button on a web interface to request the call, or when the caller is signed into the system or when the online presence of the caller is detected, or when the call is initiated from a VoIP terminal that has a graphics capability), the system uses the graphical user interface to assist the caller. When the system fails to detect the online presence of the caller, the system uses the IVR system to provide the caller (buyer) with guidance. Thus, the system automatically switches between using the web interface to guide the caller or using the IRV interface to guide the caller.

In one embodiment, the system may further use other communication systems to guide the callee (e.g., according to the presence and availability of such communication systems). For example, the interface may be Wireless Application Protocol based (WAP-based) applications, or based on instant messaging, or based on a custom designed client-server application/protocol. Thus, a web-based interface is presented as an example. User interfaces based on other communication protocols and/or other types of communication systems can also be used.

In one embodiment, the system may ask the caller (buyer) to hang up temporarily until the callee accepts the call. Alternatively, the system may allow the caller (buyer) to stay on the line while the system attempt to reach the callee (seller).

In one embodiment, the system allows the callee (seller) to specify one or more alternative phone numbers in case the callee (seller) is not reachable at the primary phone number specified for the listing. Similarly, the caller (buyer) may also specify one or more alternative call back phone numbers. In one embodiment, the system allows the parties to specify other telephonic references (e.g., user names of internet telephonic application) to make the telephone connection. In one embodiment, the system may further allow the user to specify other identities to make connections for other types of real time communications, such as chat, instant messaging, video conferencing, etc. In this application, instead of calls over phones connected to a PSTN or via VOIP connections, the communication connections can be in the form of typewritten/text chat, video, screen sharing, common whiteboarding, application sharing, or other types of communications.

In one embodiment, the system arranges the call according to aspects of the methods described in the U.S. Patent Application Publication No. 2004/0252820 (application Ser. No. 10/360,776, filed on Jun. 12, 2003), which is hereby incorporated herein by reference.

When the caller (buyer) requests the connection using the call button, the web server provides the instructions and feedback to guide the caller (buyer) through the call process.

When the caller (buyer) dials the callee's listing via the Ether phone number (e.g., the 800 number assigned to the callee), an interactive voice response (IVR) system is used to provide similar instructions and feedback to guide the caller (buyer) through the call process.

For example, the caller (buyer) registers and creates an identity using the phone number and a PIN. A credit card is asked for via IVR or live operator to set up payment options. Then the call window is entered on the keypad of the phone, such as pressing the string of keys "4*" to indicate a "4" hours window or "60#" for a "60" minutes window.

In one embodiment, when the callee is having a telephonic connection with the system, the system prompts the caller (buyer) to utter a message for the callee (seller). For example, the caller (buyer) may say "I'm Bob Stanley-remember we met at the golf conference last weekend." The system records the messages of the caller (buyer). When the callee (seller) gets the call, the system says, "There's a buyer on the line who's paid $100 and is willing to wait 4 hours and here's how he identifies himself: 'I'm Bob Stanley—remember we met at the golf conference last weekend.'" The system in such a way provides as much identifying information to the callee (seller) as possible so that the callee (seller) may screen the callers for acceptance. In one embodiment, the system behaves as an automatic secretary, screening who's on the line for the callee (seller).

In one embodiment, the system provides functionality for bulk-minute pricing.

For example, once a call starts, the system metes out the time that has been bought. When the time limit, for example, 60 minutes, is up, the system tells both parties on the phone that the time is up. The system then prompts the buyer to add more money to buy a second package, or go to per minute pricing, or end the call, or let them talk further for free, according to the continuation policy of the call which is specified by the callee (seller) in the listing (e.g., specified during the creation of the listing).

In one embodiment, if the parties hang up after just, for example, 35, minutes of a 60-minute call, the system has a time window in which it expires the remaining minutes. The time window can be set quite large, such as a year, so that someone can buy a 1,000-minute discount package and talk 100 times over the course of the year. Or the time window can be set small, such as 30 minutes, in which case the caller (buyers) can call again within the 30-minute window after the 35-minute call to keep talking based on the already purchased 60-minute package, but the caller (buyers) can be connected on the basis of the unused portion of the 60-minute call package after a break that is longer than the time window.

In one embodiment, the system time window specifies the longest period of break before the unused portion of the purchased package expires.

In one embodiment, the system time window specifies the period from the starting of the conversation and the time when the purchased package expires. For example, the system may specify a window of 4 hours or so by default, so that people who get cut off or interrupted can finish their calls in this window of time.

In one embodiment, the system time window is based on the size of the purchased package. The larger the time limit of the package, the larger is the time window. In one embodiment, the expiration of the package is based on a limit on the separate calls (e.g., three). In one embodiment, the expiration of the package is based on the expiration time window and the limit on separate calls, whichever is reached first.

In one embodiment, the system allows the callee (seller) to specify the expiration time window in the specification of the listing (e.g., as part of the continuation policy of the call package) and/or the limit on the separate calls.

FIGS. 5-12 show examples of flow diagrams of a process to connect a user and an adviser for telephonic conversation according to one embodiment of the present invention.

In one embodiment, when a caller selects (e.g., clicks) on a call button according to one embodiment of the present invention, the selection (e.g., click) leads down several different paths depending on the availability status of the seller.

Figure 5:
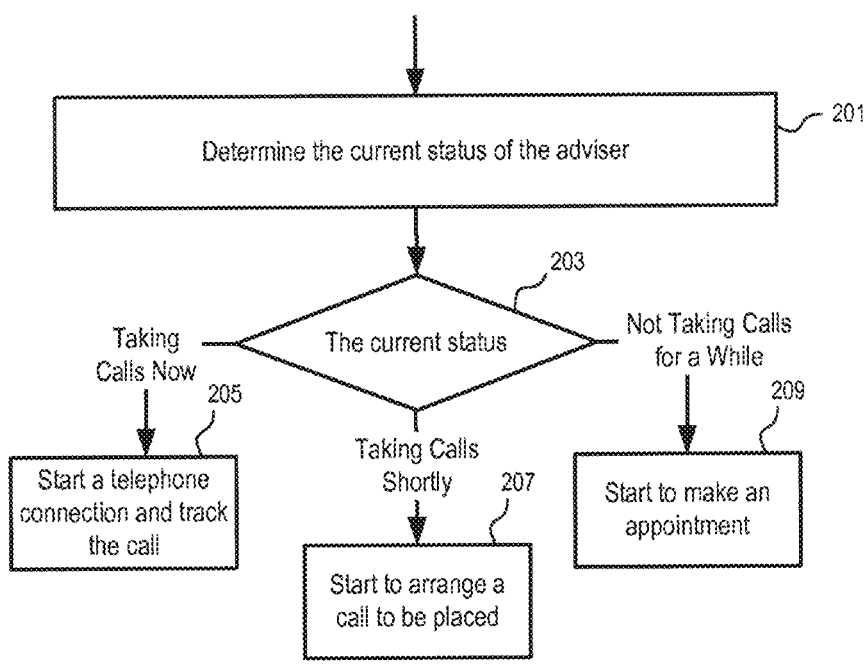
FIGS. 5-12 show examples of flow diagrams of a process to connect a user and an adviser for communication according to one embodiment of the present invention.

For example, in FIG. 5, the system determines (201) the current status of the adviser at the time the telephonic connection is started. In one embodiment, the current status of the adviser is determined based at least partially on the information provided by the adviser. For example, the adviser can specify the scheduled hours of the day during which the adviser is expected to take calls; the adviser may select a button (e.g., push through placing a cursor over the button on a display of a graphical user interface and activating a selecting device, such as a key or a button of a cursor positioning device such as a mouse or a touch pad or a joystick, etc.) on a web page, or make a phone call to the system, to indicate whether the adviser is currently busy and not answering new calls and/or to further specify the estimated duration of the busy period. The adviser may select a button on a user interface (e.g., a web page designed for the manage of the listing and/or account of the adviser) to indicate that the adviser is now free and ready to take calls. The adviser may pick up the phone call from the system and indicate to the system the current status of the adviser. The adviser may transmit the current status information to the system using instant messages, email, SMS messages, etc.

If the current status (203) of the adviser is "Taking Calls Now" or something equivalent, the system starts (e.g., immediately) a telephone connection and tracks the call (205).

If the current status (203) of the adviser is "Taking Calls Shortly", the system starts (207) to arrange the call to be placed within the time period specified by the caller without trying to call the adviser immediately, since the adviser is temporary busy and will be available to take calls within a short period of time.

If the current status (203) of the adviser is "Not Taking Calls for a While" or something equivalent, the system starts (209) to make an appointment for the user to call the adviser, since the adviser is not available to take the call and will not be available for a longer period of time.

Figure 6:
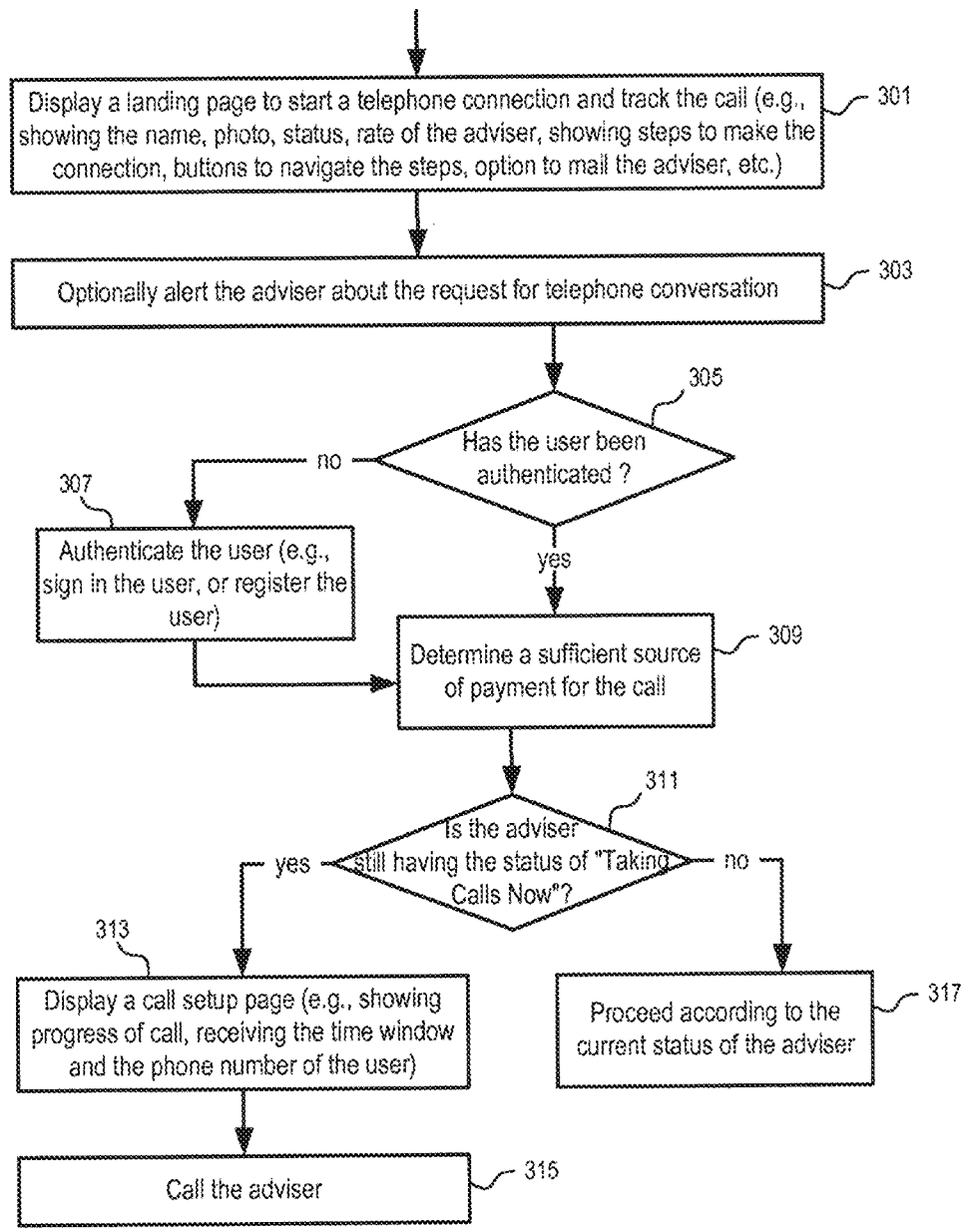

In FIG. 6, when the system starts to at least initiate a telephone connection (e.g., in response to a request from a selected call button), the system displays (301) a landing page to at least initiate a telephone connection and track the call. For example, the web server of the system transmits information defining the landing page to the web browser of the user to show the landing page (e.g., in a pop-up window).

For example, the landing page may show the name, photo, status, rate of the adviser, show/explain the process to make the connection, buttons to navigate the process, option to mail the adviser, etc.

Optionally, the system alerts (303) the adviser about the request for telephone conversation (e.g., through a web-based user interface, or through email, instant messaging, short text message, etc.)

The system determines whether the user has been authenticated (305). If the user has not been authenticated, the system authenticates (307) the user. For example, the system signs in the user if the user is already a member, or registers the user as a new member if the user is not yet a member.

The system then determines (309) a source of payment for the call.

After the system has identified a source of payment for the call based on the price for the call specified by the adviser in the listing, the system may further determine if the adviser is still having the status of "Taking Calls Now". In certain instances, the process of authenticating the user and securing the source of payment may take an extended period of time such that the availability status of the adviser may have changed.

If the adviser is no longer available for immediate connection, the system proceeds (317) according to the current status of the adviser, based on whether the current status is "Taking Calls Shortly" or "Not Taking Calls for a While".

If the adviser is still available for immediate connection, the system displays (313) a call setup page. The call setup page may show the progress of call and user interface elements to receive the time window and the phone number of the user (caller).

Once the time window within which the user (caller) is available for the call and the call back phone number of the user is received, the system calls (315) the adviser.

Figure 7:
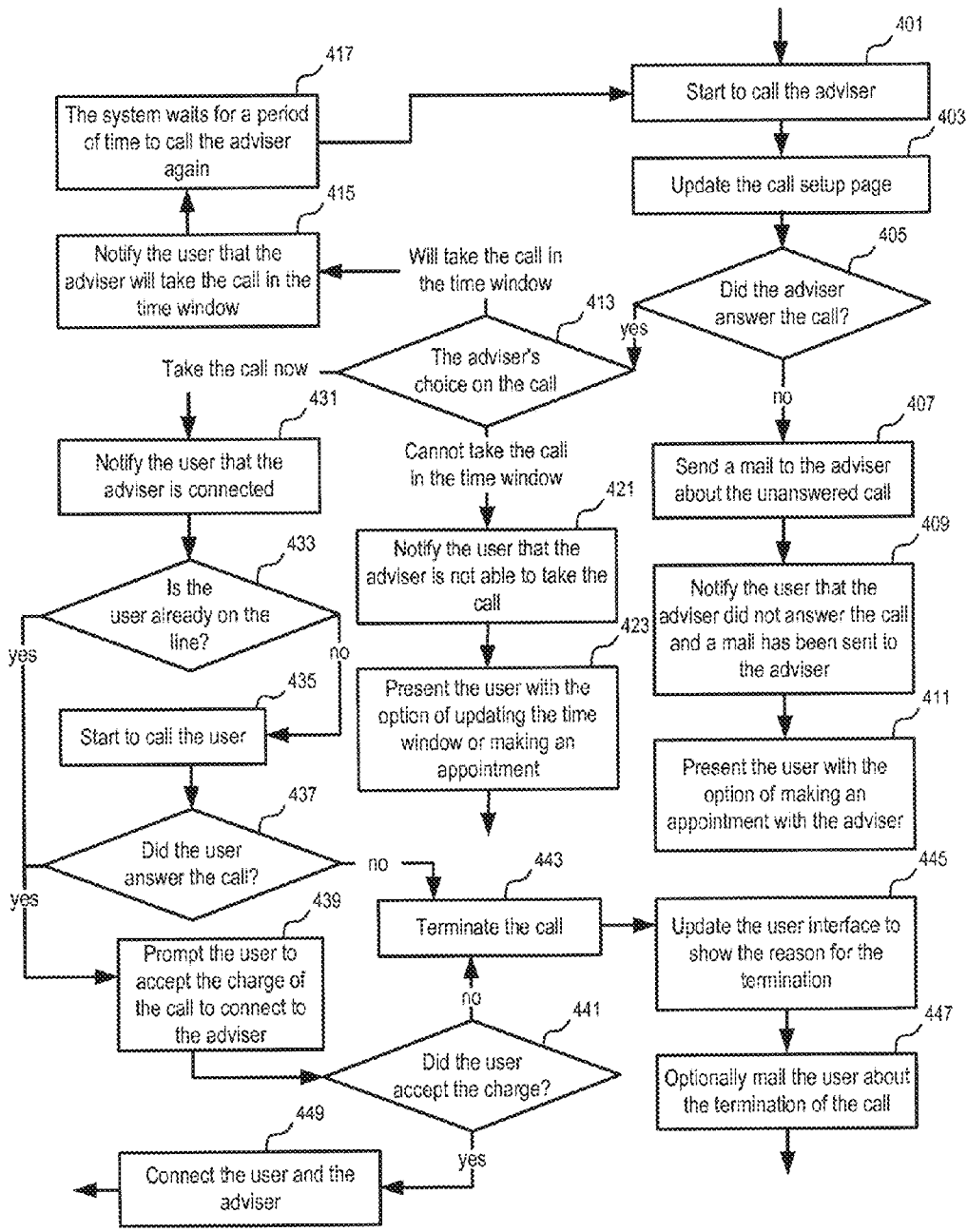

In FIG. 7, after the system starts (401) to call the adviser, the system updates (403) the call setup page. For example, the system may play an animation and/or sound clip and/or a text message to indicate that the system is calling the adviser, in one embodiment.

Then, the system determines whether or not the adviser answered the call (405).

If the adviser failed to answer the call, the system sends (407) a mail to the adviser about the unanswered call. The system notifies (409) the user that the adviser did not answer the call and a mail has been sent to the adviser. The system then presents (411) the user with the option of making an appointment with the adviser.

If the adviser answered the call, the system obtains the adviser's choice (413) on the call.

The adviser may indicate that the adviser will take the call in the time window specified by the caller, in which case, the system notifies (415) the user that the adviser will take the call in the time window. Then, the system waits (417) for a period of time to call the adviser again. Alternatively, the system may try the connection based on an indication from the adviser that the adviser is ready to take the call (e.g., by calling the system, selecting a button or a link on a web page in the account of the adviser, sending an email/instant message/short text message to the system or replying to a message from the system about the call, etc.)

The adviser may indicate that the adviser cannot take the call in the time window specified by the caller, in which case, the system notifies (421) the user (caller) that the adviser is not able to take the call and presents (423) the user with the options of updating the time window and making an appointment.

The adviser may indicate that the adviser wants to take the call now, in which case, the system notifies (421) the user that the adviser is connected and the server is now calling the user (at which point of the process, the caller may or may not one the phone). The system then determines if the user is already on the line (433).

If the user is not already on the line, the system starts (435) to call the user and determines whether the user answered the call (437).

If the user did not answer the call back, the system terminates (443) the call (443) and the adviser is notified.

After the user answers the call back, the user is on one line and the adviser on another line. The system then prompts (439) the user to accept the charge of the call before connection to the adviser and determines whether the user accepts the charge (441).

If the user accepts the charge, the system connects (449) the user to the adviser (e.g., by joining the calls) and starts to monitor aspects of the call (e.g., duration) and charge the user.

If the user rejects the charge or fails to provide a response within a predetermined period of time, the system terminates (443) call. After the termination of the call, the system updates (445) the user interface to show the reason for the termination. Optionally, the system mails (447) the user about the termination of the call.

Figure 8:
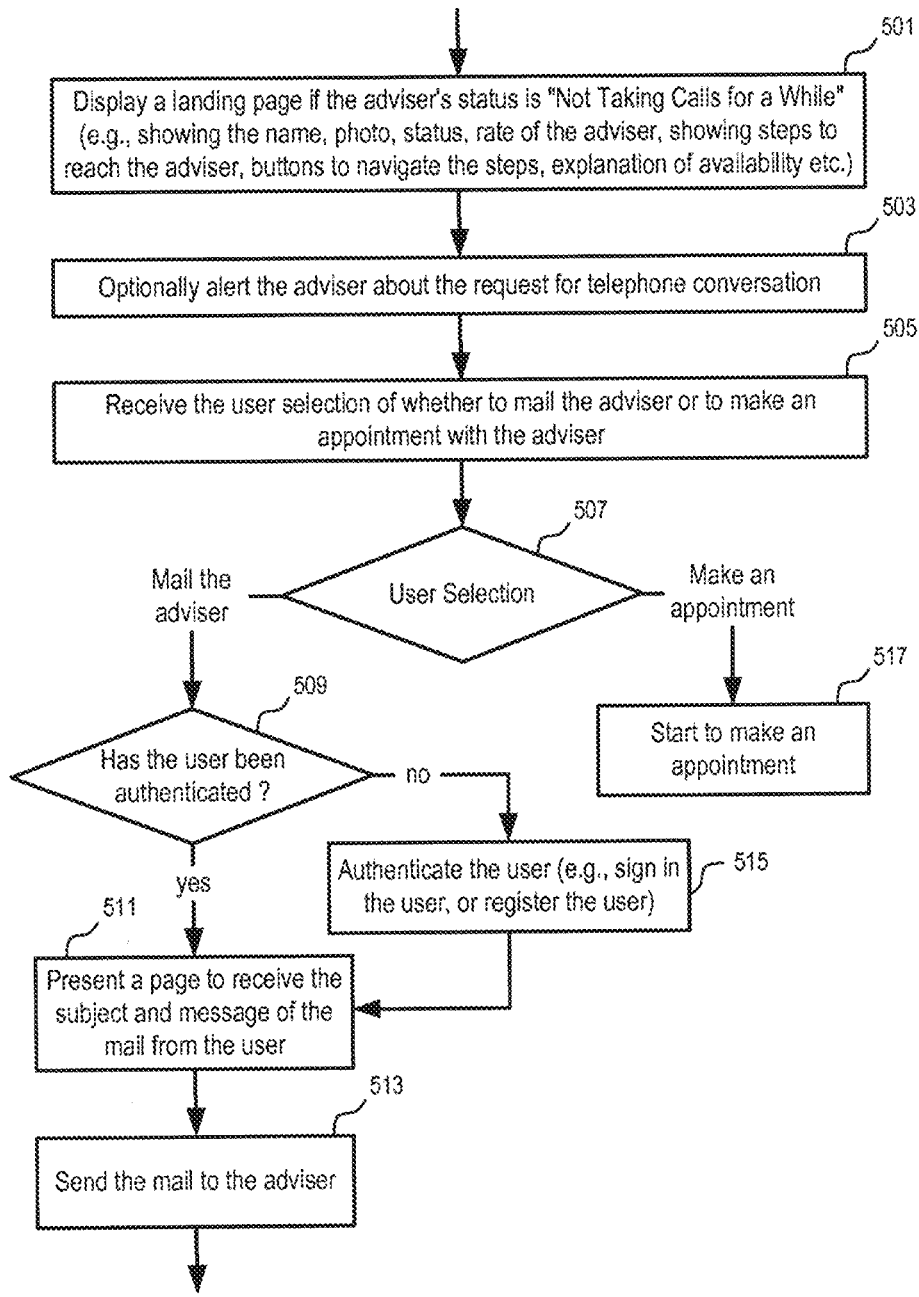

In FIG. 8, the system displays (501) a landing page, if the adviser's status is "Not Taking Calls for a While". The landing page may show the name, photo, status, rate of the adviser, and show the process to reach the adviser, buttons to navigate the process, explanation of availability, etc.

Optionally, the system alerts (503) the adviser about the request for telephone conversation.

In one embodiment, the system receives (505) from the landing page the user selection whether to mail (e.g., email or use other types of messaging systems) the adviser or to make an appointment with the adviser.

If the user selection (507) is to mail the adviser, the system determines if the user has been authenticated (509). If the user has not been authenticate, the system authenticates (515) the user. For example, if there is no cookie in the web browser of the user indicating that the user is currently in a valid session, the user may be presented with an interface to sign in or to register.

If the authenticated user chooses to mail the adviser, the system presents (511) a page to receive the subject and message of the mail from the user. After receiving the subject and message of the mail, the system sends (513) the mail to the adviser (without showing the mailing address of the adviser to the user and without showing the mailing address of the user to the adviser) in accordance with one embodiment.

In one embodiment, the mail is delivered electronically (e.g., through an email, instant message, SMS message, web mail). Alternatively, the mail may be delivered as voice mail, print out, etc.

If the user selection (507) is to make an appointment, the system starts (517) to make an appointment.

Figure 9:
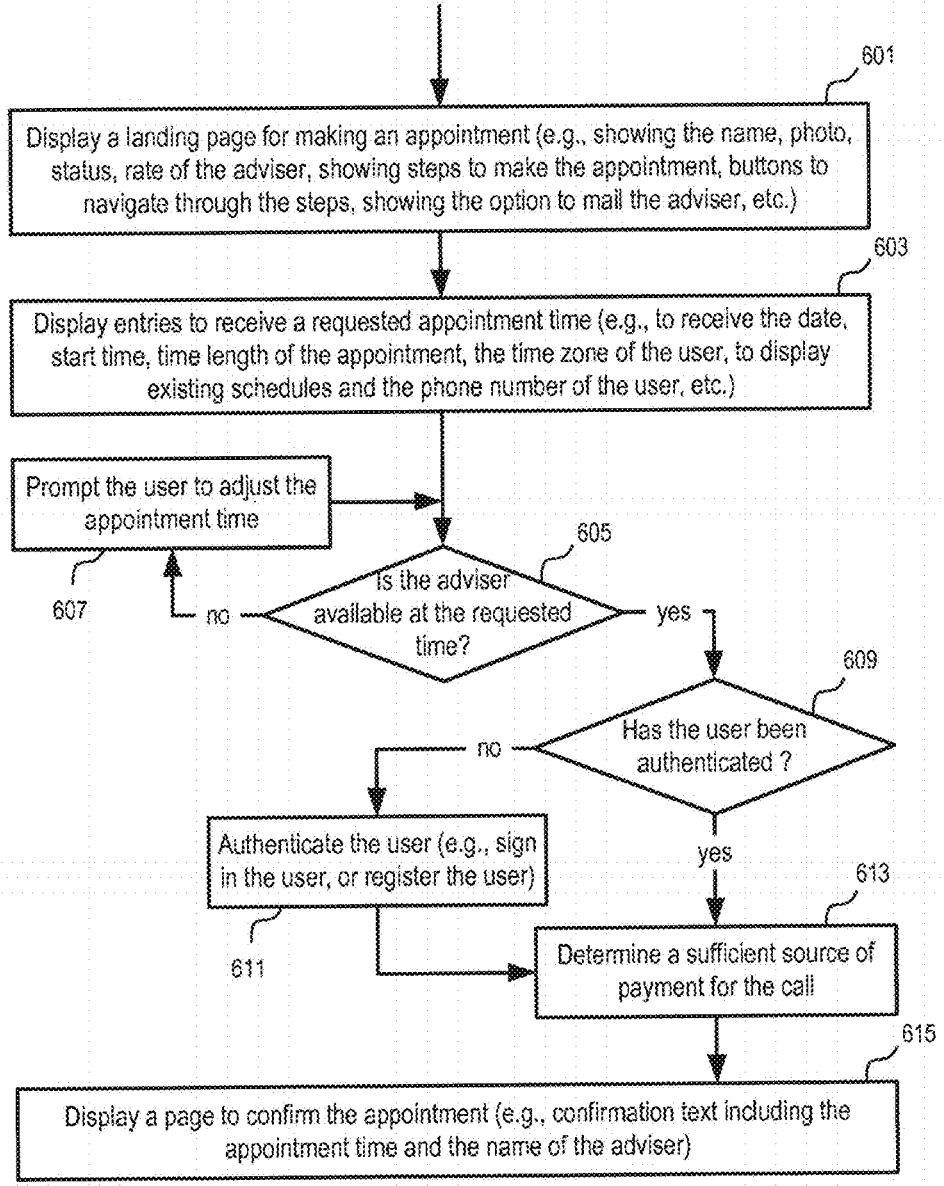

In FIG. 9, the system displays (601) a landing page for making an appointment. The landing page may display one or more of the name, photo, status, rate of the adviser, and show stages of operations to make the appointment, buttons to navigate through the stages of operations, show the option to mail the adviser, etc.

The system displays (603) entries to receive a requested appointment time. The entries can be part of the landing page or a page displayed after a navigation button is selected. In one embodiment, the entries are used to receive one or more of the date, start time, time length of the appointment, the time zone of the user, etc.

In one embodiment, the system further displays existing schedules and the phone number of the user, etc. for the convenience of the user (e.g., if the user is already authenticated at this point of the process).

After the requested time of the appointment is received from the user, the system determines if the adviser is available at the requested time (605). If the adviser is not available at the requested time, the system prompts (607) the user to adjust the appointment time; otherwise, the system proceeds to the task of filtering the callers.

If the system determines that the user has not been authenticated (609), the system authenticates (611) the user through signing in the user or registering the user. The system then determines (613) if a sufficient source of payment for the call is available from the user.

If there is a sufficient source of payment for the call, the system accepts the appointment and displays (615) a page to confirm the appointment. The confirmation page may show confirmation text including the appointment time and the name of the adviser.

In one embodiment, after the appointment is made, the system automatically starts to make connections to the caller and the callee separately at the requested time of the appointment. Alternatively, the system may reserve a time slot on the schedule of the callee on behalf of the caller and request the caller to make a request for a connection at the scheduled time. Alternatively, the system may request the adviser (callee) to make the request for the connection. For example, the system may determine a less reliable one of the two to make a request for the connection, or contacting the less reliable one first, during the appointment time is reached before starting to contact the other party.

Figure 10:
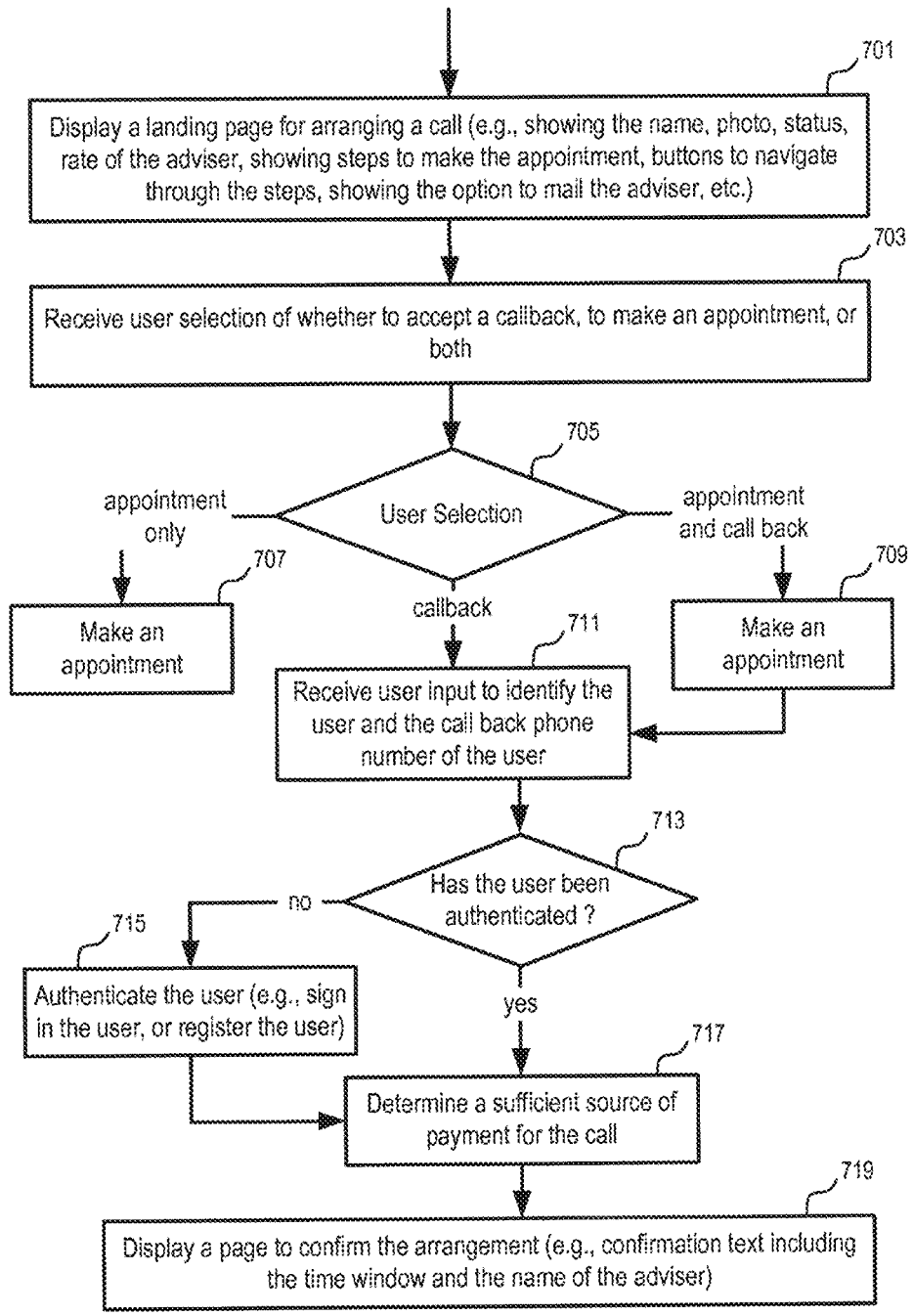

In FIG. 10, the system displays (601) a landing page for arranging a call. The landing page may display one or more of the name, photo, status, rate of the adviser, show stages of operations to make the appointment, buttons to navigate through the stages, show the option to mail the adviser.

The system receives (703) a user selection of whether to accept a callback, to make an appointment, or both.

If the user selection includes making an appointment, operation 707 or operation 709 is performed to set up an appointment (e.g., according to the process illustrated in FIG. 9).

If the user selection includes accepting a callback, the system receives (711) user input to identify the user and the call back phone number of the user and determines whether the user has been authenticated (713). If the user has not yet been authenticated, the system authenticates (715) the user (e.g., through signing in the user or registering the user).

After the user is authenticated, the system determines (717) if a sufficient source of payment for the call is available (e.g., to filter out non-serious callers). The system then displays a page to confirm the arrangement (e.g., confirmation text including the time window and the name of the adviser).

Figure 11:
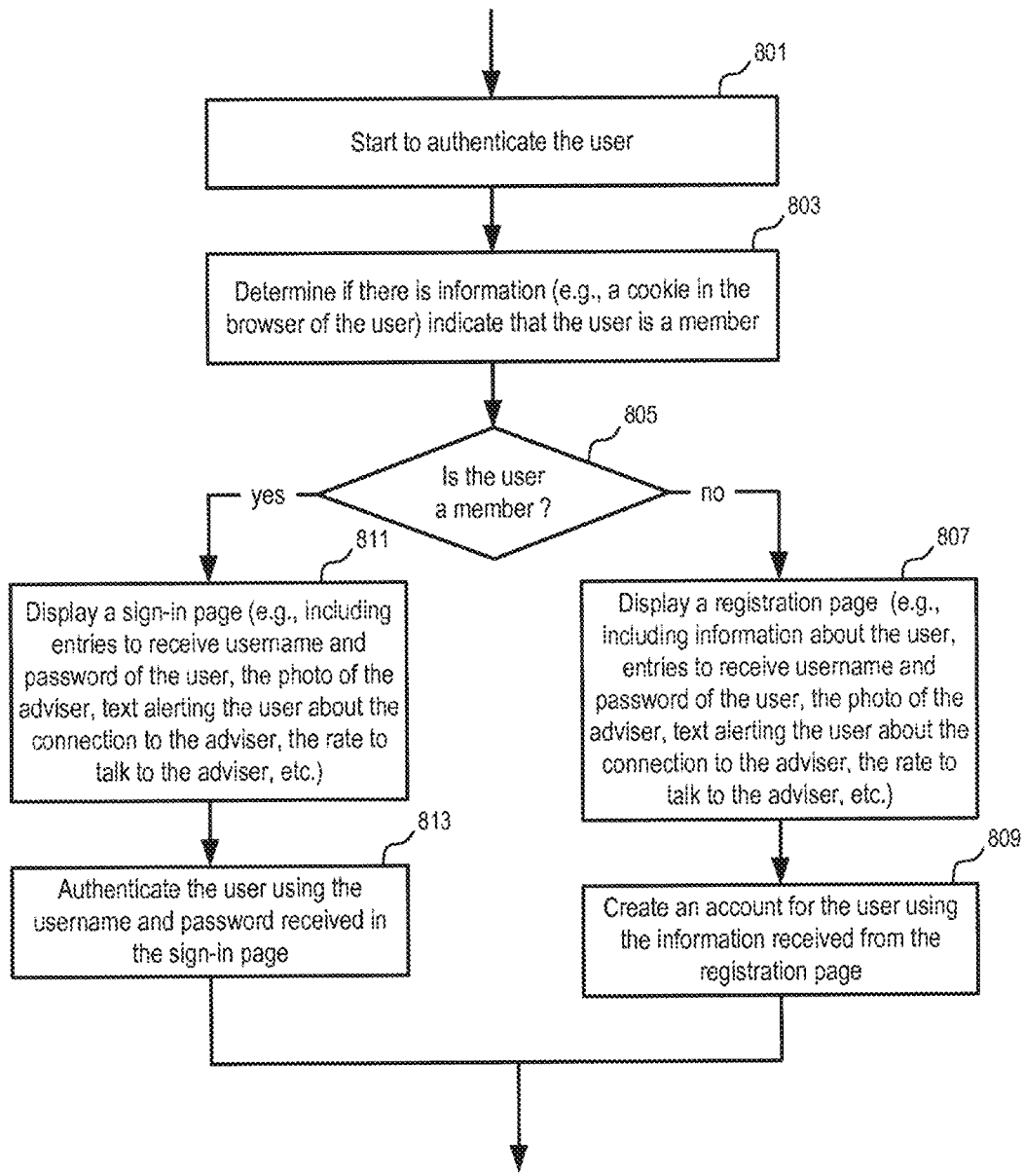

FIG. 11 shows an example to authenticate the user. In FIG. 11, after the system starts (801) to authenticate the user, the system determines (803) if there is information to indicate that the user is a member. The information may be in a cookie in the browser of the user, or a parameter encoded in an URL (universal resource locator) of a link, or a parameter in an applet running in the web browser.

If the user is a member (805), the system displays (811) a sign-in page which may include entries to receive a username and a password from the user. In one embodiment, the sign-in page may optionally further include the photo of the adviser, text alerting the user about the connection to the adviser, the rate to talk to the adviser, etc. Thus, the sign-in appears to be in the environment of the adviser. The system then authenticates (813) the user using the username and password received in the sign-in page.

If the user is not a member (805), the system displays (807) a registration page. The registration page may include information already collected about the user (e.g., during the interaction before the registration) for confirmation purpose. The registration page includes entries to receive username and password of the user. In one embodiment, the registration page may optionally further include the photo of the adviser, text alerting the user about the connection to the adviser, the rate to talk to the adviser, etc. Thus, the registration appears to be in the environment of the adviser. The system then creates (809) an account for the user using the information received from the registration page.

In one embodiment, after the user is authenticated, information is created to indicate that the user is authenticated for a valid session (e.g., using a cookie, a parameter in URL or in an applet) until the session expires or the user signs off.

Figure 12:
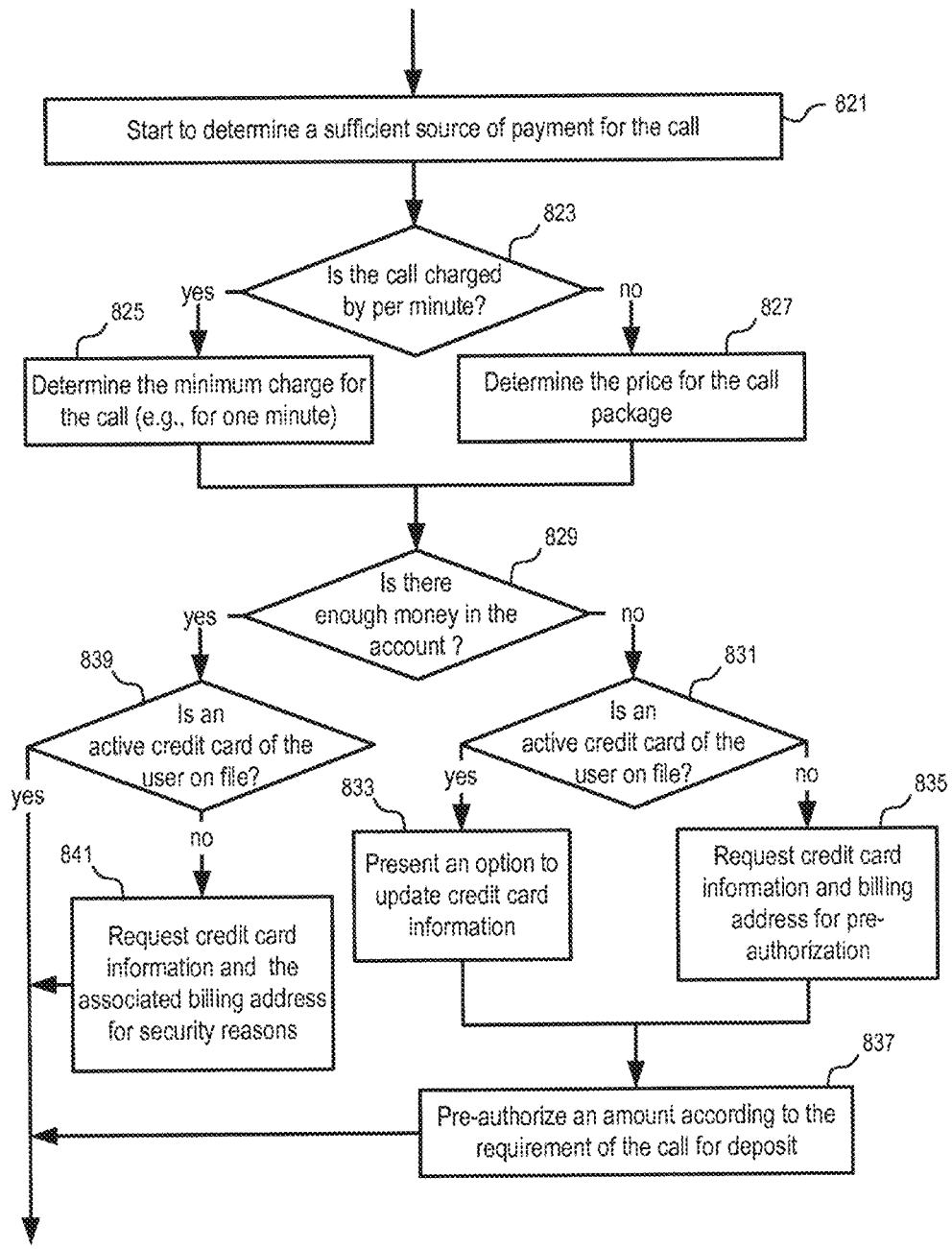

FIG. 12 shows an example to determine if a sufficient source of payment of the call is available.

After the system starts (821) to determine if a sufficient source of payment for the call is available, the system determines (823) whether the call is charged by per interval (e.g., per minute). If the call is charged by per interval, the system determines (825) the minimum charge for the call (e.g., for one minute). If the call is not charged by per interval, the system determines (827) the price for a call package (e.g., $100 for 1 hour, as specified by the adviser).

The system then determines whether there is enough money in the account of the user (829) and/or whether there is an active credit card of the user is on file (839 and 831).

If the account of the user has enough money for the call and/or an active credit card of the user is not on file, the system optionally requests (841) for the credit card information and the associated billing address for security reason.

If the account of the user does not have enough money for the call, the system will pre-authorize (837) an amount according the requirement of the call for deposit purpose. If an active credit card of the user is on file, the system optionally presents (833) an option to update the credit card information. If no active credit card of the user is on file, the system requests (835) credit card information and billing address for pre-authorization.

In one embodiment, when information identifying the user is available (e.g., through a "cookie" implemented in the web browser or parameters encoded in the URL, or parameters stored in the variables of an applet running in the web browser, etc.), the system uses the information about the user to help the user. For example, from the member information database, the system may retrieve the phone numbers of the user. If there are multiple phone numbers for the user, a combo box is displayed for the user to select one from the known phone numbers of the user (or to type in a different one). If there is only one known phone number of the user, the system may display the known phone number of the user in an entry box as the default value.

If a user as identified by the information (e.g., cookie) is different from the current user, the current user can choose to edit the information and/or sign in as a different user.

In one embodiment, a user can enter the input information to set up a call, such as the call window and/or the callback phone number before the user is authenticated. When the user is subsequently authenticated (e.g., through signing in as an existing member or registering as a new member), the information provided by the user before the authentication process is used to update the account information (if changed).

Figure 13:
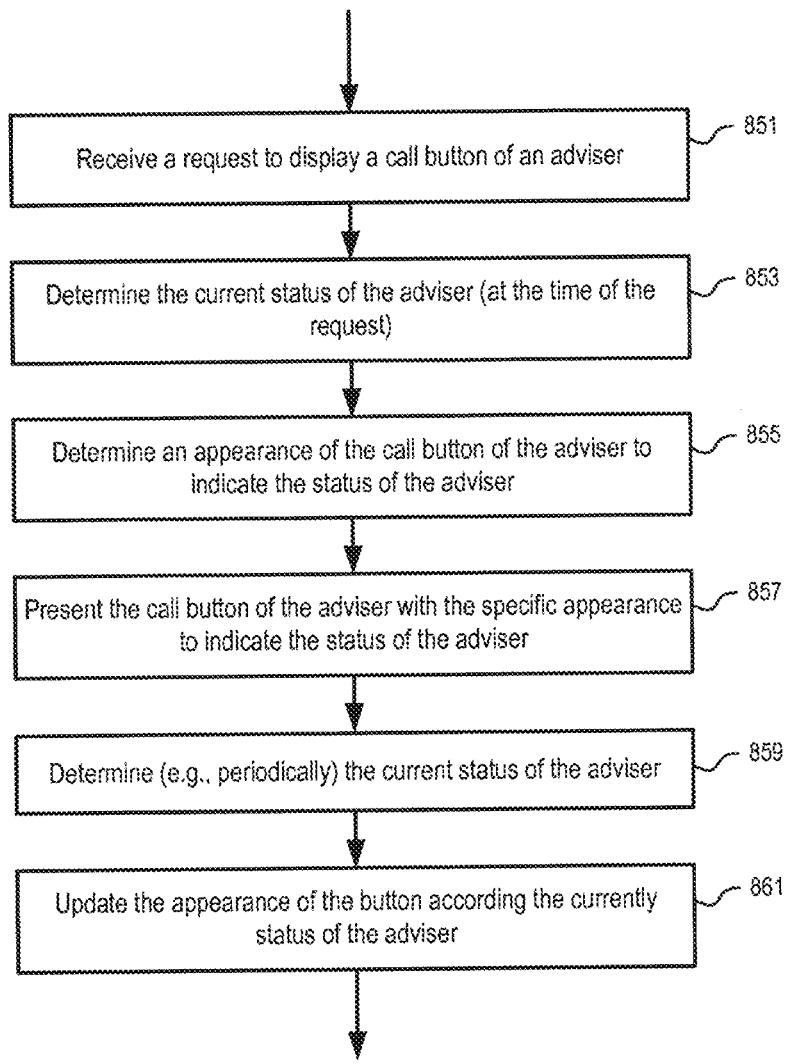
FIG. 13 illustrates a method to display a call button according to one embodiment of the present invention.

FIG. 13 illustrates a method to display a call button according to one embodiment of the present invention.

In one embodiment, the appearance of a call button is displayed according to the current availability status of the adviser to take the call.

For example, in FIG. 13, when the system receives (851) a request to display a call button of an adviser, the system determines (853) the current status of the adviser (at the time of the request). After the system determines (855) an appearance of the call button of the adviser to indicate the status of the adviser, the system presents (857) the call button of the adviser with the appearance to indicate the status of the adviser.

In one embodiment, the system further determines (859) (e.g., periodically) the current status of the adviser to update (861) the appearance of the button according the currently status of the adviser.

For example, the call button to be inserted in the blog of the callee can include an image at a URL on a server computer. When being requested the URL causes the server computer to determine a response based on the parameters encoded in the URL. For example, the URL can be pointing to a CGI (Common Gateway Interface) program which provides or generates the image according to the current status of the adviser. The URL may include a parameter to identify the adviser and/or the advertisement.

For example, when the current status of the adviser is "Taking Calls Now", the call button may show a telephone with text "Call Now"; when the current status of the adviser is "Taking Calls Shortly", the call button may show an off-hook telephone with text "Arrange a Call"; when the current status of the adviser is "Not Taking Calls for a While", the call button may show a telephone and a calendar with text "Appointment".

In one embodiment, different types of availability status of a callee (adviser) includes: on call, off call, busy, get in line, schedule an appointment, join conference, etc. It is understood that different systems may implement more or less types of availability status of a callee. Further, the call button may include other current status information about the callee, such as price, how many people are in line to call the callee, the schedule of the callee, and/or others.

In one embodiment, the call button is implemented using an applet running in the browser of the user. The applet displays the call button according to the current status of the adviser and checks the status of the adviser periodically to update the appearance of the button. In one embodiment, when an estimated time until which the adviser can take the call is available (e.g., received in the system from the adviser when the system attempts to contact the adviser, or provided by the adviser when the adviser is talking to a different user, etc.), the call button also shows an indication of such an estimated time to help the user in selecting a time window.

Alternatively, the call button may be implemented in custom applications (e.g., as plug-in to web browsers, email clients, etc., or as stand-along applications). The call button may communicate with the server using a special purpose protocol.

In one embodiment, a web/email (document) authoring tool is designed to automatically detect the phone number of the callee in a web page/email/document. The authoring tool can be set up to replace the phone number of the callee with the corresponding call button assigned to the callee and/or the phone number (e.g., ether phone number) that is assigned to the callee. For example, the authoring tool can detect the occurrence of the phone number of the callee in the document and prompt the user of the authoring tool to replace the phone number of the callee with the call button and/or the phone number assigned by the system. If the user accepts the suggestion, the authoring tool automatically replace the phone number of the callee with the call button and/or the phone number assigned by the system.

Figure 14:
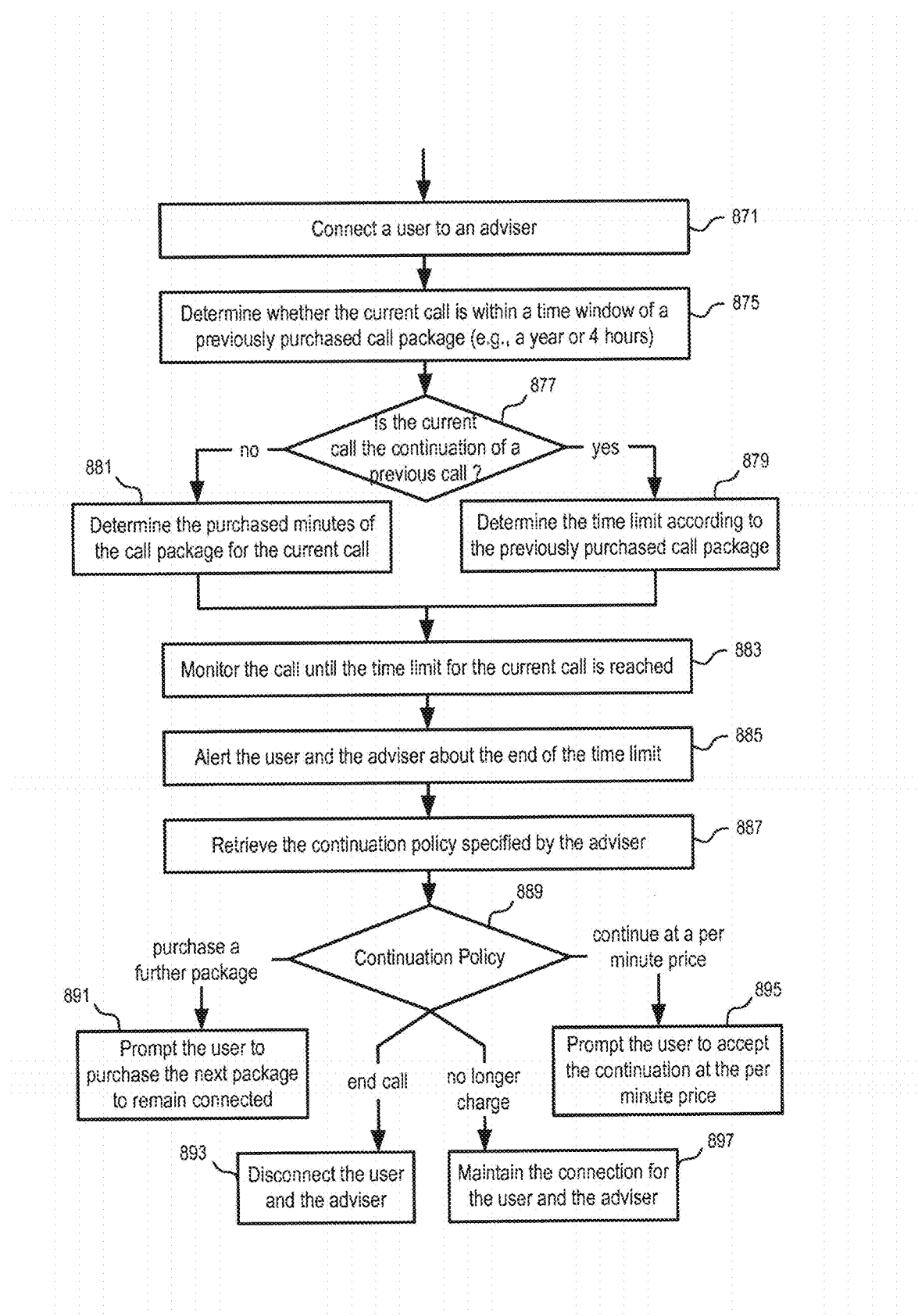
FIG. 14 illustrates a method to monitor and control a connection according to one embodiment of the present invention.

FIG. 14 illustrates a method to monitor and control a connection according to one embodiment of the present invention.

In FIG. 14, after the system connects (871) a user to an adviser, the system determines (875) whether the current call is within a time window of a previously purchased call package (e.g., a year or 4 hours).

In one embodiment, a call is considered a continuation of the previously purchased call package if the current call is within the time window. Thus, if the call of a previously purchased call package is interrupted, the user can continue the call within the time window without having to purchase another package.

Based on whether or not the current call is the continuation of a previous call (877), the system determines (879) the time limit according to the previously purchased call package, or determines (881) the purchased minutes of the call package for the current call. The system then monitors (883) the call until the time limit for the current call is reached. When the time limit for the call is reached, the system alerts (885) the user and the adviser about the end of the time limit.

In one embodiment, the continuation policy specified by the adviser is retrieved (887) to process the call at the end of the time limit.

If the continuation policy (889) is "purchase a further package", the system prompts (891) the user to purchase the next package to remain connected. For example, the user may be offered to continue the call at the price of $50 for another 30 minutes.

If the continuation policy (889) is "continue at a per minute price", the system prompts (895) the user to accept the continuation at the per minute price.

If the continuation policy (889) is "no longer charge", the system maintain (897) the connection for the user and the adviser until at least one of the user and the adviser hangs up.

If the continuation policy (889) is "end call", the system disconnects (893) the user and the adviser after altering the user and the adviser.

In one embodiment, the system stores a replication of the policy of the package the user purchased with the records of the purchased call (e.g., the policy at the time the call button is selected for the call package, or at the time the user is first connected to the adviser for the call package, or at the time the user explicitly confirms the purchase of the call package, etc.). Thus, the adviser is free to change the listing for the future callers even before the users finish the purchased call packages without retroactively affecting the purchased calls.

Some of the above examples are in the context of telephonic conversations. From this description, it will be understood that the techniques for connecting people for real time communications can also be applied to other types of communications, such as video and other multimedia channels, chat, instant messaging, document sharing, or screen-sharing, common "whiteboarding," interactive TV or internet TV, etc. Each of different multimedia channels can have different prices or be inclusive in one price (e.g., the use of part or all of the different channels can be included in the same price).

The real time communication may be on a one-to-one basis (e.g., one caller connected to one callee). The real time communication can also be in the form of one-to-many. For example, the seller may be hosting a conference in which multiple callers may attend. For example, 100 people can be in the same call or the same video session provided by the same seller.

Further, in one embodiment, the real time communication may include access to recorded sessions (e.g., recorded audio content and/or recorded video content).

Thus, the system on the whole may be used as a filter for sellers (callees), only letting in calls from people who are serious—they're serious because they have entered their credit card and are willing to pay. Celebrities can use the system. For example, people want to talk to the Oakland A's from the 70's, who are sitting on their porches these days. For example, Hollywood executives can use the system to hear pitches from scriptwriters who are willing to pay $1000 for the chance to pitch their script.

In one embodiment, these call buttons and the Ether phone numbers go to where the action is happening. In at least one embodiment of the present invention, it is recognized that not all service commerce will happen through marketplaces, such as keen dot com or a search engine. People who want to talk to the Oakland A's players are more likely the visitor of the Oakland Athletics web site and that's where the call buttons can be very effective. And the Ether phone numbers can be in magazines, underneath photographs, in newspapers, on business cards, etc.

In one embodiment, the current status of the callee (e.g., availability, schedule, etc.) and guidance and instructions for the phone connection are provided through the appearance of the call button and the content of the call graphic. Alternatively or in combination, the status information, guidance and instructions can also be presented based using an interactive voice response (IVR) system.

For example, a talk radio station may have a guest on every day at a noon talk show. After the one-hour show, the radio announcer may say, "The time is up on our show. We've enjoyed talking with Dr. Webber and answering your calls. If you'd like to talk further with Dr. Webber, go to our website at WKBR dot com and set up a conversation with him. Or, just dial the number 1-800-TALK-KBR and get in line. It's just $29 per 10-minute conversation."

In this example scenario, the phone number 1-800-TALK-KBR is assigned to Dr. Webber, which can be used to achieve many of the same goals as the call button assigned to Dr. Webber. While the button can visually communicate to the user the current (e.g., real-time) availability of the callee, the price, how many people are in line already, the schedule of the callee, etc., telephony prompts on a interactive voice response (IVR) system can also be used to provide such information after the caller dials the phone number that is assigned to the callee.

For example, in one embodiment, after a caller dials the phone number 1-800-TALK-KBR, the call is connected to a server, which determines that the call is for Dr. Webber since the phone number 1-800-TALK-KBR is assigned to (associated with) Dr. Webber. The server can then determine the current status of Dr. Webber, including the availability status, the price for the package, etc., and provide the information to the caller through the IVR system. In one embodiment, the server prompts options according to the current availability status of Dr. Webber. For example, the server may offer an immediate connection when Dr. Webber is available for immediate talk, or an opportunity to input a callback time window and/or callback phone number when Dr. Webber is expected to be available in a short period of time, or an opportunity to schedule an appointment with Dr. Webber when Dr. Webber is not expected to be available in a short period of time, etc. The server may use the IVR system to inform the caller the current status of the connection process and to provide instructions to the caller to take actions, such as providing a callback time window, providing an appointment time, providing an indication to accept the price of the call package, etc.

In one embodiment, the status information, instruction and guidance are provided using a combination of graphical presentations (e.g., over a graphical user interface terminal) and voice prompts (e.g., through an IVR system).

In one embodiment, the callee (seller) charges the caller(s) for the real time communication. The system provides the service to arrange and connect the call. The system can collect the payment from the caller(s), deduct a portion of the payment as fees to provide the service, and deliver the remaining payment to the callee (seller).

Alternatively, the callers may be not required to pay for the call; and the callee (e.g., advertisers) may pay the system for the service. In this case, the system may not provide the filtering functionality based on the willingness of the callers to pay. However, the callees (e.g., the advertisers) can still enjoy other benefits from the service provided by the system, such as call scheduling (no night calls), call queuing, toll-free number, local phone number, click-to-call, etc.

In one embodiment, the call buttons and the phone numbers assigned to the callees can also be published in advertisements in marketplaces, online or offline, on behalf of the callees; the callees bid for changes of the publicity and pay the bid amount on a per call basis for calls generated by the advertisements. When the callees generate the phone lead from their own media channel, the callees are only charged for a flat fee for the service of making the connection. Thus, in one embodiment, the system tracks the media channels that lead the caller to make the call.

Figure 15:
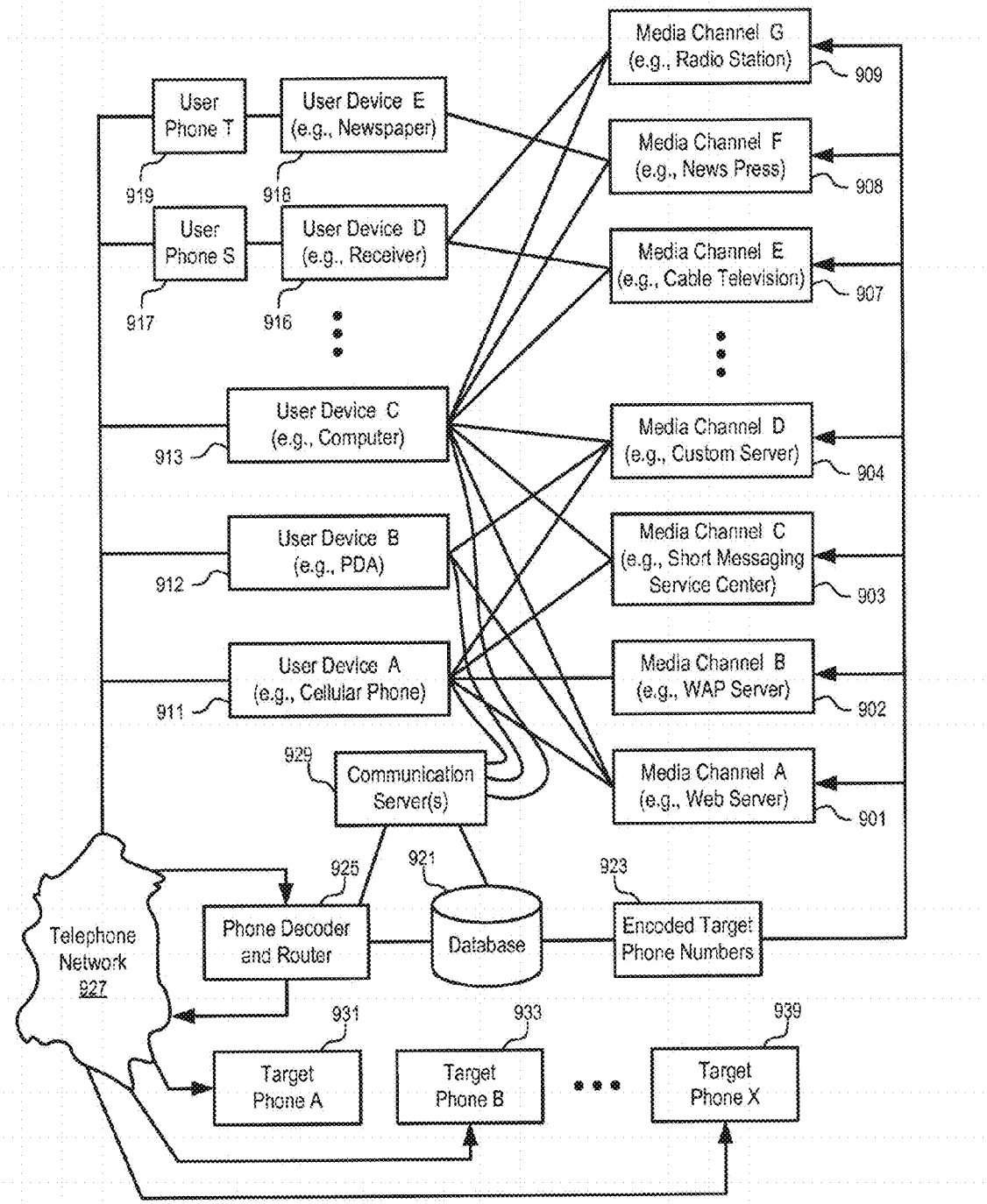
FIG. 15 shows a diagram of a system to assist and track connections according to one embodiment of the present invention.

FIG. 15 shows a diagram of a system to assist and track connections according to one embodiment of the present invention.

In FIG. 15, a database (921) may contain the phone numbers of target phone A (931), target phone B (933), . . . , target phone X (939), etc., of callees. Typically, the target phones belong to the institutions, businesses, individuals, etc, which seek for the services of embodiments of the present invention.

The call button and/or phone numbers assigned to the callees are distributed in various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the call buttons and/or the assigned phone numbers, which can be considered as the encoded phone numbers of the callees, are presented in the environment specific to the callees, not in the marketplaces that are specially designed to advertise the callees. Thus, the callees generate the phone leads on their own media distributions, such as their web site or blog site.

Alternatively, or in combination, the call buttons and/or the assigned phone numbers can also be presented in marketplaces, such as in listings/directories of services, advertisements in search results, etc.

In one embodiment of the present invention, the phone numbers of the target phones are not directly publicized over the media channels. Instead, encoded target phone numbers (923) are used. Using the encoded target phone numbers (923), a user cannot reach target phones directly. Using the encoded target phone numbers (923), a user reaches a server of the system first, which allows the system to provide various services before actually connecting the user to the callee, such as filtering, payment processing, etc.

The encoded target phone numbers (923) allow the association of additional information with the target phone numbers, such as the media channels used, special promotions, etc.

The encoded target phone numbers and/or the call buttons are delivered with content information (e.g., web page, WAP page, short message, television programs, news articles, advertisement, blog, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, etc.).

In one embodiment, a user device is capable of dialing a phone call (e.g., automatically according to the encoded phone number embedded in the content information when a user selects the number). Alternatively, a user may manually dial a phone call using a separate phone, such as user phone S (917) or user phone T (919).

In one embodiment, a user device (e.g., 911, 912, 193) is capable of rendering the call button and sending a message to the communication server(s) (929) when the call button is activated. The call button includes an identifier of the callee so that when the call button is activated the user devices communicates the identifier of the callee to the server(s) (929).

In one embodiment, the user device (e.g., 911) is further capable of automatically identifying a phone number of the caller, or a VoIP identifier of the caller, as a callback number. Alternatively, the user device (e.g., 911, 912, 913) is capable of communicating with the server(s) (929) to present user interfaces to receive the callback number and other parameters, such as the callback time window.

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the connection to target phone numbers can be paid for on a pay per call basis. Monitoring and tracking the calls can be used for billing the callee and/or the caller.

In one embodiment of the present invention, the additional information associated with the encoded target phone number is used to tracking phone calls for conditional promotions, electronic coupons, etc. Alternatively, the additional information for conditional promotions, electronic coupons, etc. are retrieved from the database of the listings at the time the corresponding call button is activated or presented, or at the time the encoded phone number is called.

The information about the media channels that are responsible for leading the users to the phone calls to the target phones can also be useful for the advisers. The advisers may wish to know which media channel is more effective in reaching users.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number (e.g., having an extension to the standard phone number). A first portion of the encoded target phone number has the same number of digits as a standard phone number to reach the phone decoder and router (925) through the telephone network (927); and a second portion of the encoded target phone number (e.g., the extension) is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The callees may be arranged to bid for shorter encoded target phone numbers.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with other parameters. To prevent revealing the target phone number and the parameters, an encryption/scrambling scheme can be used to encode the second portion, which is decoded at the phone decoder and router (925).

In one embodiment, the phone decoder and router (925) determines the target phone number from the encoded target phone number dialed by the user and then dials the target phone number for the user and joins the phone calls so that the user can talk to the target phone.

In one embodiment, the communication server(s) (929) determines the target phone number from the message sent from the user devices when the call button is pressed.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number. Alternatively, the system initiates the VoIP connection to the user device after receiving the message from the user device requesting the phone connection.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 15, the user device initiates the phone call. Alternatively, a phone router may be used to initiate phone calls both to the user device (or a separate user phone) and the target phone and then join the phone calls to connect the user to the target phone. For example, when the user selects the call button, the encoded target phone number is transmitted to the communication server(s) (929), which can instruct the phone decoder and router (925) to initiate the phone calls.

The user phone number can be automatically determined through ANI, or through a user preference setting, or through an entry submitted with the selection of the encoded target phone number (e.g., the call button).

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

Provide Communication Connections

One embodiment of the present invention enables a partner to offer communication references for entities (e.g., in online marketplace, voice portal, advertisement placement, etc.) such that real-time communication connections to the entities can be established when the communication references are used to request for the communication connections.

For example, a marketer may operate a web site to promote sellers (e.g., advisors, advertisers), an online marketplace, and/or a voice portal. The marketer has the contact information of the sellers, such as phone numbers. The marketer may not have the facilities to track the phone calls to the phone numbers of the sellers. As a partner of a connection provider, the marketer may provide the contact information of the sellers to the connection provider and obtain links and/or custom 800 numbers that can be used by the customers of the marketer to at least initiate the real-time communication connections to the sellers. For example, when a customer of the marketer selects the link, or dials the 800 number, that is assigned for a seller of the marketer, the connection provider makes an arrangement to connect the customer to the corresponding seller using the contact information of the seller. Thus, the marketer does not have to maintain separate facilities to track the phone calls and make the phone connections; and the connection provider can provide the service to different marketers.

Further, in one embodiment, responsive to the establishment of the connection between the customer and the seller, the connection provider may further charge the customer a fee on behalf of the seller for purchasing from the seller (e.g., purchasing a period of real-time communication with the seller and/or products/services offered over the communication connection) and/or charge the seller on behalf of the marketer a fee for the advertisement presented by the marketer. The connection provider may further distribute the charged fee to the marketer and/or to the seller directly or indirectly via the marketer. Thus, the marketer may delegate a payment processing task associated with tracking and providing communication connections to the connection provider. Alternatively, the marketer may perform the payment processing tasks based on the information about the communication connections tracked and provided by the connection provider.

In one embodiment, a connection provider may enable a marketer to focus on the aspect of matching customers and sellers and delegate to the connection provider the tasks of providing communication connections, tracking the communication connections, collecting fees, and/or distributing payments.

In one embodiment, a marketer may use the services of a connection provider to operate an online marketplace and voice portal. The services of the connection provider may be behind the scene and/or customized for the marketer such that the customers of the marketer may not be aware of that part of the services is from the connection provider which may be an entity different from the marketer.

Figure 16:
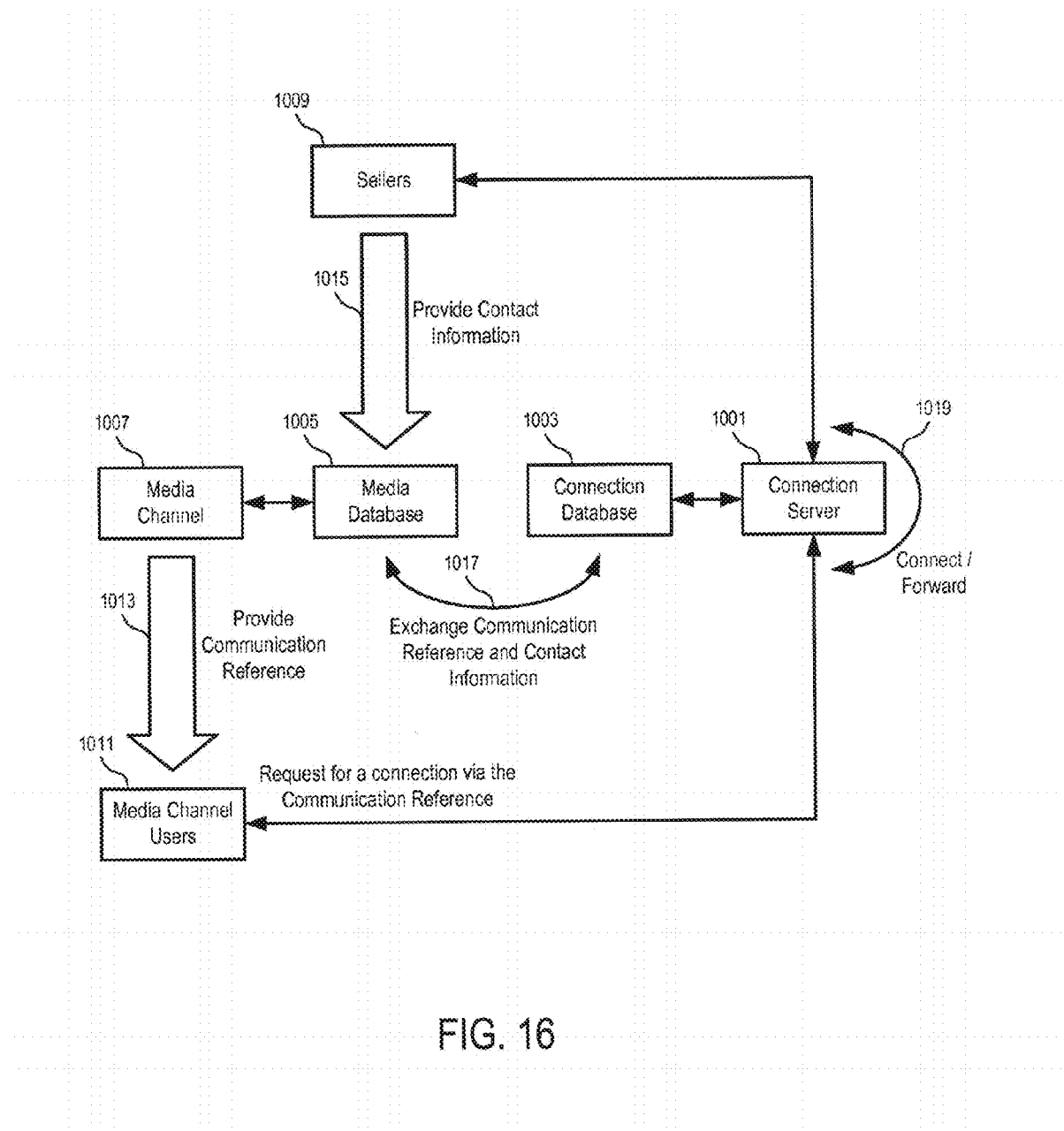
FIG. 16 illustrates a system to provide communication connections according to one embodiment of the present invention.

FIG. 16 illustrates a system to provide communication connections according to one embodiment of the present invention. In FIG. 16, sellers (1009) provide (1015) their contact information to the media database (1005). The media database (1005) may also include other information that is used by the media channel (1007) to present the sellers (1009) to the medial channel users (1011).

In FIG. 16, the contact information of the sellers is not provided to the media channel users (1011). Instead, a communication reference can be assigned to the contact information of a seller and provided (1013) to the media channel user (1011) via the media channel (1007). The media database (1005) and the connection database (1003) exchange (1017) communication reference and contact information of the sellers. The connection server (1001) is used to connect the sellers and the media channel users (1011). Using the communication reference, a media channel user may request for a connection with the corresponding seller. The connection server (1001) determines the contact information based on the communication reference used to make the request.

For example, using the contact information looked up according to the communication reference, the connection server (1001) makes a connection with the seller and then connects the media channel user and the seller (e.g., through forwarding communications across the connection server).

In one embodiment, the media channel (1007) and the media database (1005) may be operated by a marketer; and the connection database and the connection server (1001) may be operated by a connection provider. The marketer and the connection provider may communicate with each other electronically to exchange (1017) the communication reference and contact information.

The communication reference may be a representation of a user interface element, such as a link, an icon, a button (e.g., in HTML or a script), which can be rendered in a browser and selected to send the request to the connection server. The communication reference may include an identifier to represent a seller or a record of the contact information of the seller. For example, the identifier may be a seller identifier that can be used to look up the seller and then determine a phone number of the seller from information about the seller. For example, the identifier may be a record identifier that points to a record in the connection database (1003); and the record includes a phone number of the seller. For example, the communication reference may be an Ether button assigned to the seller.

The communication reference may be a phone number of the connection server (1001). The phone number may or may not include an extension that is to be dialed after the connection server (1001) picks up the call from the medial channel user. The phone number can be used as a seller identifier or a record identifier to look up the phone number of the corresponding seller. The phone number may be a toll free number (e.g., an 800 number) or a phone number local to a geographic area (e.g., an area in which the media channel users are located).

In one embodiment, the media database (1005) can provide the contact information of the seller (e.g., the phone number of the seller) to the connection database (1003) and update the contact information of the seller according to the input for the seller. Thus, a copy of the contact information of the seller is stored/cached in the connection database (1003). The connection provider may alternatively request the contact information corresponding to a communication reference from the media database in real time and/or cache the information (e.g., for a session, for a predetermined period of time).

In one embodiment, the connection database (1003) can provide the media database the communication reference for a specific seller (or a specific contact information entry of the seller). The media database (1005) may request the communication reference at a setup time for the seller so that the entry of the seller is properly set up and the media channel may use the entry to present the seller (e.g., in response to a search request, in response to a request to show the listing of a specific category, in response to a placement of an advertisement in a web page, etc.) The media database (1005) may alternatively request the communication reference on demand (e.g., when the media channel receives a request for a display of the seller).

In one embodiment, a connection server may provide connection services for multiple marketers who operate different media channels (e.g., web pages, newspapers, magazines, television broadcasting systems, bill boards, etc.). A communication reference may further include an identifier that can be used to identify the corresponding marketer. Thus, the connection server may use the identifier to contact the marketer for information about the seller (e.g., availability status, contact information) and/or provide credit/compensation to the marketer.

In one embodiment, a button representation of the communication reference may show the current status of the seller to engage in real time communication with the media channel user. At the time the button is rendered in the web browser, the web browser further downloads information about the current status of the seller to determine the appearance of the button. Thus, before the button is selected by the user, the user may see an indication of availability of the seller to accept the call. Since the status information is downloaded at the time of the rendering of the button, the current status of the seller is displayed. Further, the button may be configured to periodically check for updated status information.

The media channel and the media database may obtain the current status information about the seller at the time the representation of the button is downloaded. The status information at the time of downloading the web page may be hardwired within the representation of the button.

Alternatively, the marketer may redirect the communication related to the status of the seller to the connection providers such that the current status information is maintained in the connection database (1003).

The connection provider may further provide the status information after the communication reference is used to request for a communication connection to the seller. For example, a call graphic may be presented to guide the media channel user through the connection operations; and the call graphic may include the current status information about the seller. For example, when the media channel user uses the phone number of the connection server to request the connection, the connection server may use an IVR system to tell the media channel user about the current status of the seller.

In one embodiment, the connection database (1005) obtains the status information from the sellers (1009). For example, when the sellers (1009) visit a web page of the marketer, the web page redirects the sellers (1009) to a server of the connection provider, which allows the sellers to specify the scheduled times for receiving communications and/or current changes to the availability statuses. The redirected web page may be displayed in a popup window so that the sellers do not have to leave the context of the web page provided by the marketer. For example, when a seller clicks on a link or icon to specify a change to the current availability status on an account management page provided by the marketer, the browser of the seller may bring up a popup window and direct the request to the web site of the marketer, which sends a redirect message to redirect the request to a web site of the connection provider, which then provides a web page for display in the popup window to collect the information related to availability, including work hours, etc. Thus, the status information is collected by the web site of the connection provider in the context of a web page of the marketer. The connection database may obtain the status information through communication with the media database (1005).

The price information may be specified in a web site of the connection provider or a web site of the marketer. For example, the marketer may redirect the task of managing price bidding to the connection provider. The connection provider may show the price information of competitors of the seller and receive a price bid from the seller. The price bid is stored in the connection database and/or provided to the marketer through a communication channel between the connection provider and the marketer.

Alternatively, for example, the marketer may manage the price bidding and stored the price information in the media database (e.g., for storing and selecting the sellers for display to the medial channel users). The price information may be forwarded to the connection database (1003). The connection server may use the price information to ask the user to confirm the purchase of a period of time of real time communication with a seller who provides information, entertainment, advice over the communication connection (e.g., before the user is connected to the seller), or charge the user and/or the seller according to the price information (e.g., for the purchase of advice, or for the advertisement for the seller).

For example, the marketer may redirect the management of call packages to the connection provider, or provide custom web pages to manage the call packages and communicate the call package information to the connection database (1003).

The connection server may manage an aspect of payment process for the marketer. For example, the connection server may collect fees from the media channel users based on the call packages purchased by the users (e.g., charging a credit account, a bank account or an online payment account) and/or distribute compensations to the sellers for the call packages sold to the users. The connection server may further manage accounts of the sellers and the users for the purposes of conducting financial transactions on behalf of the marketer. Thus, the marketer may be freed from the burden of managing some of the financial transactions.

Alternatively, for example, the marketer may process the financial transactions with the users and sellers, after the connection server reports the information about the communication connections to the marketer, such as the date and time of the connection and the duration, etc. The connection server can use the communication references to identify the sellers in collecting the information related to the communication connections.

The connection server may communicate with the marketer to authenticate the media channel user. For example, the connection server may verify with the marketer that the media channel user is a registered user of the marketer so that the user may be charged accordingly.

In one embodiment, the connection server may collect the credit card account information (or bank account information, or other types of accounts) and forward the account information to the marketer so that the marketer may charge the user. Alternatively, the connection server may charge the user on behalf of the marketer.

In some types of services, the media channel users (1011) may or may not be charged for the communication. For example, the sellers may use the media channel to present advertisements to the media channel users; the sellers may be charged for the advertisement (e.g., in response to the connection); and the media channel users are not charged. Further, for example, the sellers may reward the channel users (1011) for having a phone connection with them to listen to their advertisement information. In another embodiment, for example, the sellers may charge the media channel users for a period of communication over the connection to receive information, entertainment, advice, etc. Thus, it may or may not necessary to identify the media channel users and determine their account information. The communication reference may include an indication of the type of information to be collected by the connection server.

From the above discussion, one understands that the marketer may delegate more or less of the tasks related to the establishment of the connection and payment processing to the connection provider.

Figure 17:
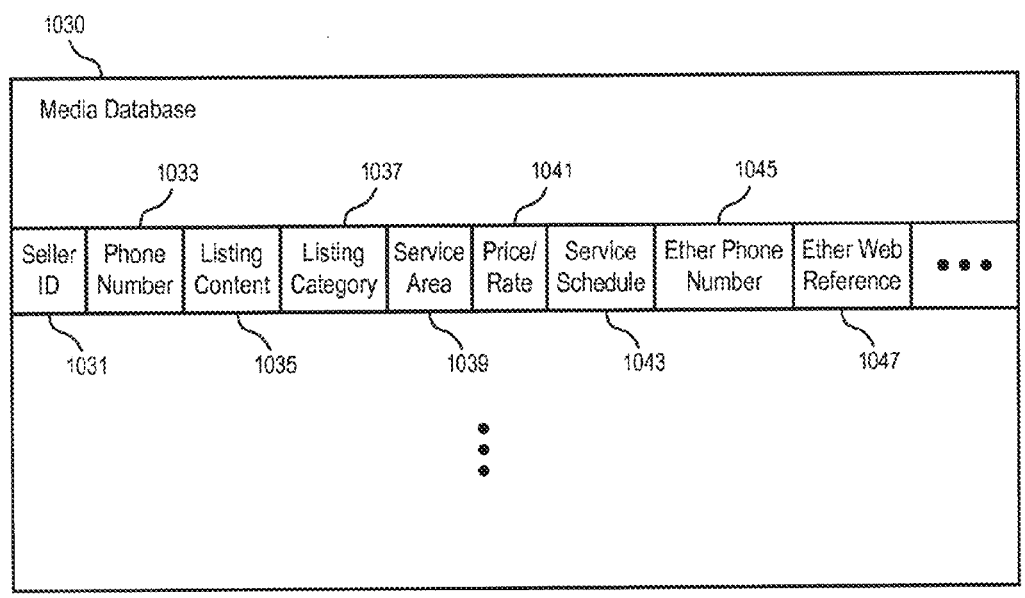
FIGS. 17-18 illustrate a media database and a connection database which can be used in a system to provide communication connections according to one embodiment of the present invention.
Figure 18:
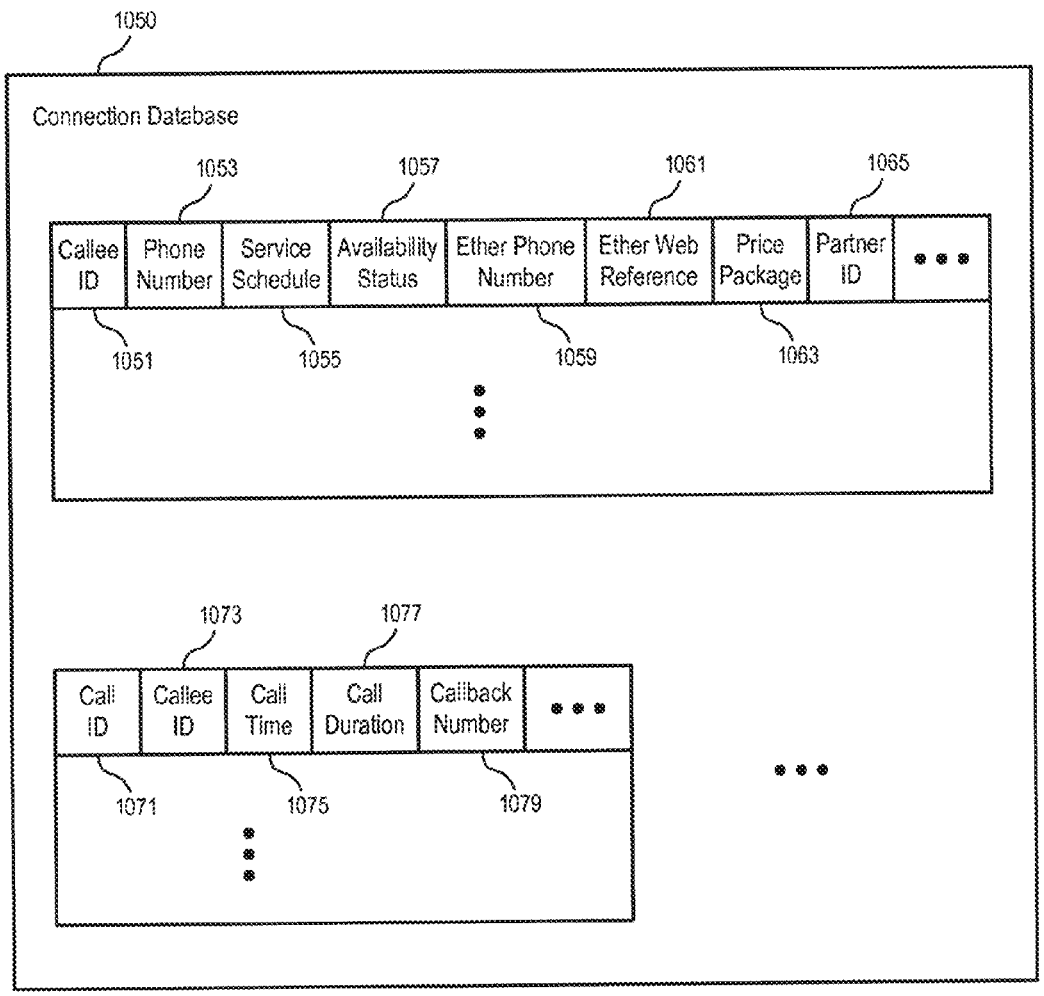

FIGS. 17-18 illustrate a media database and a connection database which can be used in a system to provide communication connections according to one embodiment of the present invention.

In FIG. 17, a media database (1030) may include a field "Seller ID" (1031) to represent a seller. For the seller, the media database (1030) may include a field to store the phone number (1033) of the seller. The phone number of the seller is typically associated with a telephone set of the seller through a telephone carrier. The phone number of the seller is typically not presented to the media channel users. Instead, an Ether phone number (1045) is presented for the seller to the media channel users. The Ether phone number (1045) may be associated with a telephone equipment of the connection provider through a telephone carrier. When the Ether phone number (1045) is dialed, the telephone carrier connects the call to the telephone equipment of the connection provider, which can determine the phone number (1033) of the seller based on the dialed Ether phone number (1045) and further connect (forward) the call to the seller.

In one embodiment, the media database (1030) obtains the Ether phone number (1045) and Ether web reference (1047) (e.g., a link or a representation of a button) from the connection provider for the seller.

The media database may further include the listing content (1035), listing category (1037), service area (1039), etc. about the seller. These information can be used by the marketer to generate a listing for presentation on behalf of the seller.

The media database may optionally include the price/rate (1041) for communications with seller, and/or for advertisement presented on behalf of the seller. The marketer may use the price/rate (1041) to selectively present sellers and to determine placement priorities for the sellers.

The media database may optionally include the service schedule (1043), such as the work hours during the day and the week. Using the service schedule (1043), the time period in which the seller is not available to receive a phone call may be determined. The media database may communicate the service schedule (1043) to the connection provider such that the availability status information can be determined at least partially from the service schedule (1043); and calls may be scheduled at least partially according to the service schedule (1043).

Optionally, some of the data fields may be maintained in a connection database of a connection provider. When needed, the data can be fetched from the connection database of the connection provider through a communication channel between the connection provider and the marketer.

In FIG. 18, the connection database (1050) may include a callee ID (1051) to represent a callee (e.g., seller). The phone number (1053) of the callee may be stored in the connection database (1050) in association the Ether phone number (1059) and the Ether web reference (1061) so that when a request for a connection is received via the Ether phone number (1059), or the Ether web reference (1061), the phone number of the callee can be determined and used to complete the connection. Alternatively, the phone number (1053) may be retrieved from the marketer (e.g., from the media database) when the request for connection is received via the Ether phone number (1059) or the Ether web reference (1061).

The connection database (1050) may further include the service schedule (1055), such as the work hours during the day and the week, and the availability status (1057) which may be changed in real time based on the information received from the callee. For example, the callee may use a communication channel (e.g., a web page) to specify the current availability status. Further, when the connection server establishes a separate phone connection with the callee, the callee may indicate the availability status to the IVR system of the connection provider.

The connection database (1050) may further include the price package (1063) which may be specified by the callee (1051). The connection provider may use the price package information to make charges on behalf of the marketer (or the callee).

The callee ID may also be associated with a partner ID (1065) which may represent the marketer. Thus, the connection provider may report the data related to connections to the corresponding marketer and/or compensate the corresponding marketer.

The connection database (1050) may include entries to record the connection activities. For example, a call ID (1071) may be used to represent a phone call. Callee ID (1073) indicates the seller that is being called in the phone call. Call time (1075) indicates the date and time of the call. Call duration (1077) indicate the time period of the phone connection between the seller and the caller. Callback number (1079) shows the callback number of the caller. Optionally, an entry for a connection may further include other information, such as the identity of the caller, credit card number of the caller, a callback time window specified by the caller, etc.

Figure 19:
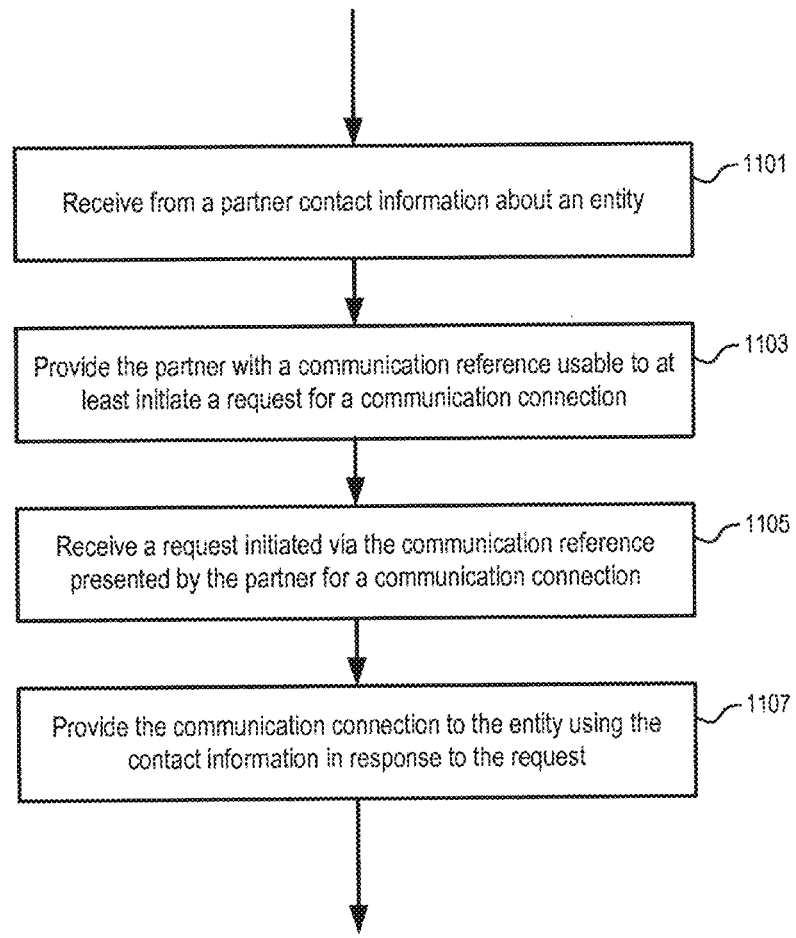
FIGS. 19-20 show flow diagrams of methods to provide communication connections according to embodiments of the present invention.
Figure 20:
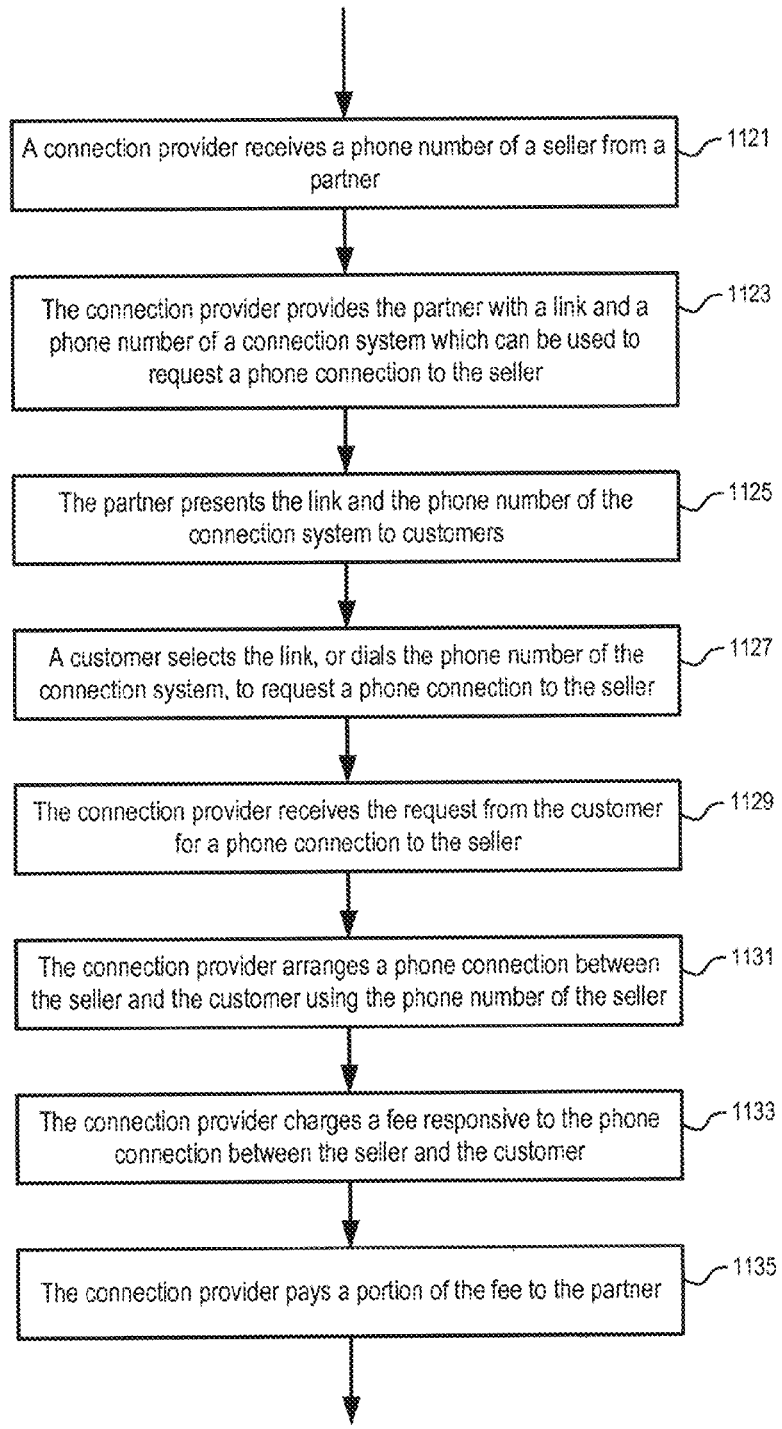

FIGS. 19-20 show flow diagrams of methods to provide communication connections according to embodiments of the present invention.

In FIG. 19, contact information about an entity is received (1101) from a partner; and a communication reference usable to at least initiate a request for a communication connection is provided (1103) to the partner. In response to that a request initiated via the communication reference presented by the partner is received (1105) for a communication connection, the communication connection to the entity is provided (1107) using the contact information.

In FIG. 20, a connection provider receives (1121) a phone number of a seller from a partner and provides (1123) the partner with a link and a phone number of a connection system which can be used to request a phone connection to the seller. The partner presents (1125) the link and the phone number of the connection system to customers. Once a customer selects the link, or dials the phone number of the connection system, to request a phone connection to the seller (1127), the connection provider receives (1129) the request from the customer for a phone connection to the seller and arranges (1131) a phone connection between the seller and the customer using the phone number of the seller.

The connection provider may charge (1133) a fee responsive to the phone connection between the seller and the customer and pay (1135) a portion of the fee to the partner. The customer may be charged for purchasing a period of phone communication with the seller; and within a period of time a customer may be reconnected to the seller with a further fee before the purchased period of phone communication elapses or expires. Alternatively, the seller may be charged for an advertisement presented by the partner on a per call basis, excluding repeated calls from the same customer made within a period of time. The phone connection may be partially carried via a VoIP system.

Figure 21:
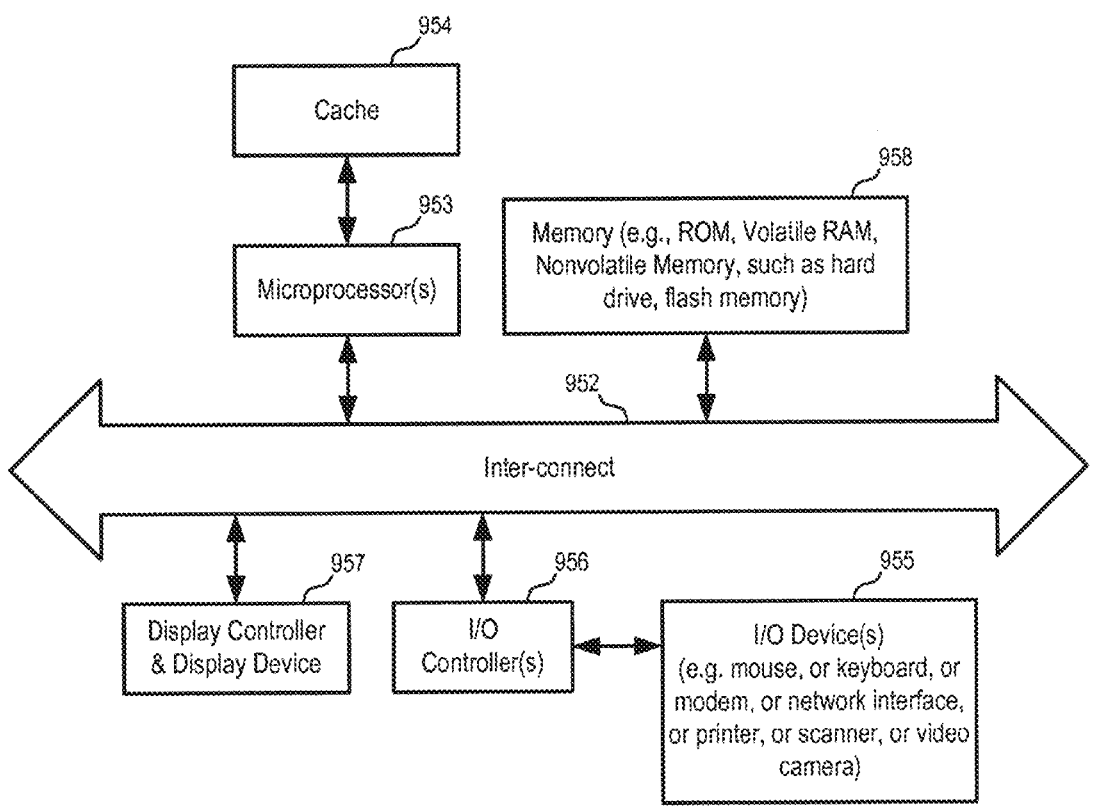
FIG. 21 shows a block diagram example of a data processing system which may be used with the present invention.

FIG. 21 shows a block diagram example of a data processing system which may be used with the present invention.

While FIG. 21 illustrates various components of a computer system, it is not intended to represent any particular architecture or manner of interconnecting the components. Other systems that have fewer or more components may also be used with the present invention.

In FIG. 21, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 21.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 21 is used as one of the communication server(s) (e.g., 929, 925, and/or 921 in FIG. 15, 1019 or 1007 in FIG. 16).

Further, a user terminal as a client system can be a data processing system similar to the system of FIG. 21. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) may be used in some embodiments of the present invention.

From this description, it will be appreciated that certain aspects of the invention are embodied in the user devices, certain aspects of the invention are embodied in the server systems, and certain aspects of the invention are embodied in a system as a whole.

Embodiments of the present invention can be implemented using hardware, programs of instruction, or combinations of hardware and programs of instructions.

Figure 22:
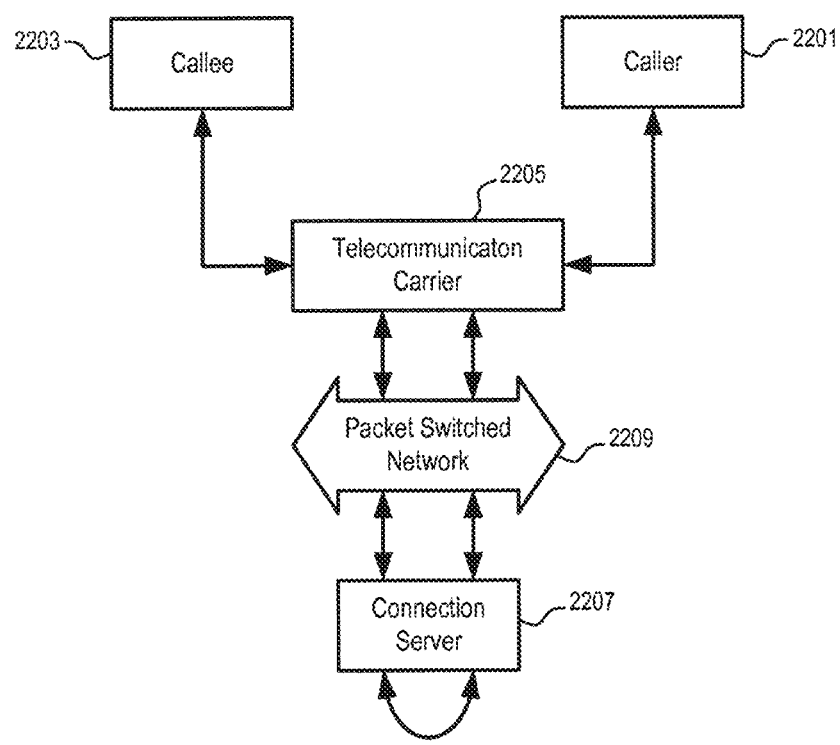
FIG. 22 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 22. In FIG. 22, the connection server (2207) receives and/or places telephone calls via the telecommunication carrier (2205) over the packet switched network (2209). The telecommunication carrier (2205) further routes the telephone communications towards the caller (2201) and the callee (2203).

Since the telecommunication carrier (2205) can route a call from a packet switched network to a variety of destinations (e.g., a traditional analog telephone set, a mobile phone, a cellular phone, a WiFi phone, a Bluetooth phone, a softphone running on a computer, etc.), the connection sever (2207) can use one type of communication connection with the telephone carrier (2205) to facilitate the communication connections with variety of devices used by the customers (e.g., callers and callees). Thus, the implementation of the connection server (2207) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (2205), to the caller (2201) (e.g., the requester of the click-to-call) and the callee (2203) (e.g., the destination of the click-to-call request).

If the caller (2201) (or the callee 2203) is on a public switched telephone network (PSTN), the telecommunication carrier (2205) bridges the packet switched the network and the public switched telephone network (PSTN). The telecommunication carrier (2205) routes the call from the packet switched network (2209) to the caller (2201) (or the callee 2203) on the circuit switched network. Thus, the caller (2201) (or the callee 2203) can use a telephone set to receive the call via a Plain Old Telephone Service (POTS). The connection server (2207) joins the separate calls that are placed via the packet switched network (2209) to connect the callee (2203) and the caller (2201).

In one embodiment, call signaling and media content may use different network paths. While call signaling is arranged to go through the packet switched network (2209) and the connection server (2207), the media stream does not have to go through the connection server (2207). For example, when the calls are joined, the media content may be redirected to flow over the communication carrier (2205) without going through the packet switched network (2209) to the connection server (2207) for improved performance and efficiency. The connection server (2207) can release the control over the media stream to allow the media stream to flow through the shortest path, without going through the connection server, while maintaining control to the connection for the call by staying on the path for call signaling.

In another example, when the caller (2201) initiates a call over a PSTN to the connection server (2207), the telecommunication carrier (2205) converts the call for the packet switched network (2209) for the connection server (2207).

In one embodiment, virtual softphones on the telecommunication carrier (2205) are assigned to the caller (2201) and the callee (2203) for interfacing with the connection server (2207) over the packet switched network (2209). The virtual softphone encapsulates the devices and networks used by the caller (2201) and callee (2203) to access the connection server (2207); and the telecommunication carrier (2205) shields the connection server (2207) from the implementation details of the user devices and networks used by the caller (2201) and the callee (2203). The connection server (2207) calls (or receives calls from) and connects the virtual softphones on the telecommunication carrier (2205) to connect the caller (2201) and the callee (2203).

In FIG. 22, the telephone connection between the telecommunication carrier (2205) and the connection server (2207) is facilitated via a packet switched network (2209). Thus, the connection server (2207) can operate efficiently in a digital domain. The connection server (2207) interfaces with the telecommunication carrier (2205) using one type of Internet Telephony systems (e.g., SIP-based Internet telephony).

Alternatively, a connection server may include some or all of the functionality of the telecommunication carrier (2205). For example, the connection server may be configured to bridge a packet switched network and a circuit switched network. The connection server may support multiple, different types of Internet Telephony systems.

In one embodiment, the connection server (2207) and the telecommunication carrier (2205) are operated by different, separate entities. Alternatively, the connection server (2207) and the telecommunication carrier (2205) may be operated by the same entity. In another embodiment, the telecommunication carrier (2205) includes a set of facilities operated by a number of separate entities.

In one embodiment, the caller (2201) and/or the callee (2203) may also place/receive calls via a packet switched network. The telecommunication carrier (2205) may route the calls between the caller (2201) and the callee (2203) without using a PSTN. In one embodiment, caller (2201) and/or the callee (2203) may place calls to or receive calls from the connection server (2207) via Internet.

Figure 23:
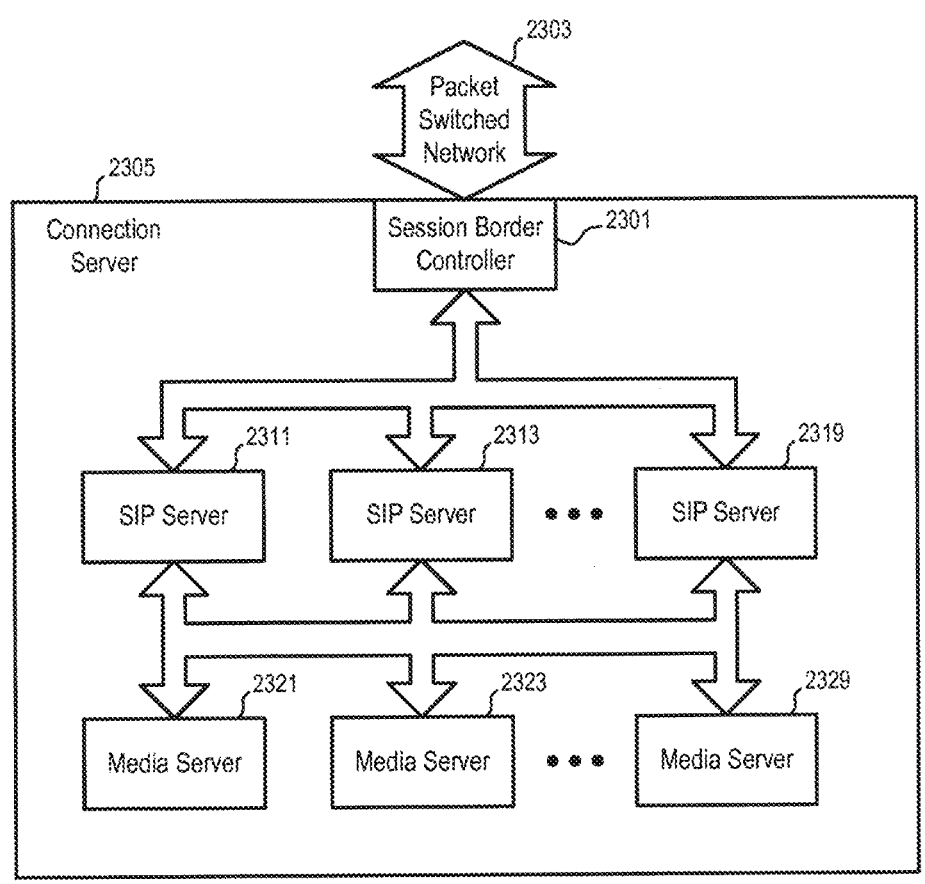
FIG. 23 shows a connection server according to one embodiment.

FIG. 23 shows a connection server according to one embodiment. In FIG. 23, the connection server (2206) is configured to place and/or receive VoIP calls using Session Initiation Protocol (SIP). A session border controller (2301) is used to interface with the packet switched network (2303) and control the types of network traffic related to VoIP calls that might go into the connection server (2305).

In one embodiment, the session border controller (2206) is configured to control the signaling and media stream during the setting up, conducting and tearing down of VoIP calls to or from the connection server (2305). In some embodiments, the session border controller (2206) may pick up the call that comes to the session border controller (2206), places a separate call from the session border controller (2206), and joins the received call and the placed call to control both the signaling and media stream. In some embodiments, the session border controller (2206) may perform signaling/encoding translation to allow the connection server (2305) to process the VoIP calls in one standard, while receiving VoIP calls in a variety of standards (e.g., SIP, H.323, etc.). In one embodiment, the session border controller (2206) is configured to perform one or more firewall functionalities, such as denial of service protection, call filtering, bandwidth management, etc.

In one embodiment, the session border controller (2206) is configured to perform media releasing operation. When the session border controller (2206) determines that the source and destination of a media stream is on the same side of the session border controller (2206) (e.g., both the source and the destination of the media stream is outside the connection server 2305), the session border controller (2206) can release the hairpining of the media stream and allow the media stream to flow without going through the session border controller (2206).

In FIG. 23, a set of SIP servers (e.g., 2311, 2313, ..., 2319) are networked to the session border controller (2301) to receive messages for incoming calls and to initiate outgoing calls. The session border controller (2301) is configured to evenly distribute the calls for processing by the SIP servers.

For example, when an incoming message for the initiation of a call is received (e.g., a SIP INVITE message from the telecommunication carrier 2205), the session border controller (2301) may route it to a SIP server (e.g., 2311) for processing. The INVITE message includes the phone number dialed by the caller and the contact information about the caller (e.g., the phone number of the caller 2201 and/or the identity of the virtual SIP phone at the telecommunication carrier 2205).

The SIP server may determine whether the phone number dialed by the caller (2203) is sufficient to determine the phone number of the callee (e.g., 2203). If the phone number of the callee (e.g., 2203) can be determined from the phone number dialed by the caller (2203) (e.g., via decoding the phone number dialed by the callee, or looking up the phone number of the callee from a table using the phone number dialed by the caller as a key), the SIP server can place a separate SIP call to the callee via the packet switched network (2303) and then connect the caller and the callee. Alternatively, the SIP server can further route the SIP INVITE message (e.g., to the telecommunication carrier (2205) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (2321) (or a virtual softphone on SIP server) as the initiator for a separate call. The SIP server then connects the calls for the media stream.

In one embodiment, the caller is first connected to a media server (e.g., 2321, 2323, or 2329). For example, the SIP server may forward the SIP INVITE message to one or more of the media servers for answering the call. When a media server (e.g., 2321) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (2303) (e.g., by sending a SIP INVITE message to the telecommunication carrier 2205, which further bridges the call to the callee 2203). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (2301) into the connection server (2305). For example, the media stream can go through the telecommunication carrier (2205) in FIG. 22 without going to the connection server (2207) after the SIP server connects the caller and the callee.

However, the SIP server stays on the signaling path to monitor the progress and termination of the call. The SIP server can also break the connection between the caller and the callee, or force the media stream to come through the connection serve (2305). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (2303) for a connection to the caller. The SIP call may be bridged onto a circuit switched network (e.g., by a telecommunication carrier 2205). The SIP server can then reconnect the call to a media server for sending a prompt to the caller before reconnecting the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (2311, 2313, ..., 2319) and media servers (2321, 2323, ..., 2329) are implemented on separate computers connected via a local area network (and/or intranet or Internet). Alternatively, at least the some of the servers can be implemented on a same computer. In one embodiment, the SIP servers and the media servers are also integrated with the session border controller (2301) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (2305) may further include a database server (2305) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method, comprising:
    receiving, over a network, from a partner, entity contact information relating to an entity, the entity contact information comprising an entity communication reference;
    providing, over the network, to the partner, a connection provider communication reference different than the entity communication reference, the connection provider communication reference being associated with the partner and the entity;
    receiving, over the network, from a requester, a request for a communication connection, the request being initiated by the requester using the connection provider communication reference, wherein receiving the request includes receiving, via a computing device, the request at a web server through redirection from the partner;
    providing, over the network, a real-time communication connection between the requester and the entity, the communication connection being initiated using the entity communication reference;
    charging, via the computing device, the requester a requester fee responsive to the real-time communication being established;
    paying, via the computing device, the entity an entity service fee, the entity service fee comprising a first portion of the requester fee; and
    paying, via the computing device, the partner a partner service fee, the partner service fee comprising a second portion of the requester fee.

2. The method of claim 1, wherein providing the real-time communication connection between the requester and the entity comprises:
    establishing, via the computing device, a first voice over Internet protocol call with a telecommunication carrier that bridges the first voice over Internet protocol call to a public switched telephone network connection to the requester;
    establishing, via the computing device, a second voice over Internet protocol call with a telecommunication carrier that bridges the second voice over Internet protocol call to a public switched telephone network connection to the entity; and
    connecting, via the computing device, the first voice over Internet protocol call and the second voice over Internet protocol call.

3. The method of claim 2, wherein:
    a first virtual softphone of the telecommunication carrier terminates the first voice over Internet protocol call;
    a second virtual softphone of the telecommunication carrier terminates the second voice over Internet protocol call; and
    connecting the first voice over Internet protocol call and second voice over Internet protocol call comprises directing, via the computing device, the first softphone and the second softphone to establish a direct media connection.

4. The method of claim 1, wherein the requester fee is based on a price specified by the entity.

5. The method of claim 1, further comprising:
providing, over the network, the partner with information about the real-time communication connection.

6. The method of claim 5, wherein the information about the real-time communication connection comprises a time duration of the real-time communication connection between the requester and the entity.

7. The method of claim 1, wherein the real-time communication connection comprises a telephonic connection; and the method further comprises:
determining, via the computing device, a time duration of the telephonic connection between the requester and the entity such that
the requester fee is based on a price specified by the entity and the time duration for a service provided by the entity over the telephonic connection.

8. The method of claim 7, wherein the entity service fee is based on the price specified by the entity and the time duration.

9. The method of claim 1, further comprising:
charging, via the computing device, the entity a connection service fee according to a price specified by the entity.

10. The method of claim 9, wherein the real-time communication connection comprises a telephonic connection; and charging the entity the connection service fee comprises:
charging, via the computing device, the entity the connection service fee independent of a time duration of the telephonic connection between the requester and the entity.

11. The method of claim 1, wherein the communication reference is rendered in a browser and presents a user interface element which, when selected, causes the browser to send the request to the partner, for redirection to the web server.

12. The method of claim 1, wherein the connection provider communication reference is embedded in a document, and wherein the request for the communication connection is initiated in response to selection of the connection provider communication reference.

13. The method of claim 1, wherein the connection provider communication reference comprises a telephone number, dialed to generate the request.

14. The method of claim 13, wherein providing the real-time communication connection comprises:
establishing, via the computing device, a telephonic connection to the entity using the entity communication reference in response to receiving the request at the telephone number.

15. The method of claim 14, wherein establishing comprises:
establishing, via the computing device, the telephonic connection to the entity at least in part through a voice over Internet protocol call.

16. A non-transitory machine readable media storing instructions that, when executed by a computing device, causes the computing device to:
receive, over a network, from a partner, entity contact information relating to an entity, the entity contact information comprising an entity communication reference;
provide, over the network, to the partner, a connection provider communication reference different than the entity communication reference, the connection provider communication reference being associated with the partner and the entity;
receive, over the network, from a requester, a request for a communication connection, the request being initiated by the requester using the connection provider communication reference, wherein receiving the request includes receiving, via the computing device, the request at a web server through redirection from the partner;
provide, over the network, a real-time communication connection between the requester and the entity, the communication connection being initiated using the entity communication reference;
charge the requester a requester fee responsive to the real-time communication being established;
pay the entity an entity service fee, the entity service fee comprising a first portion of the requester fee; and
pay the partner a partner service fee, the partner service fee comprising a second portion of the requester fee.

17. A system, comprising:
a processor; and
memory coupled to the processor and storing instructions that, when executed by the processor, cause the system to:
receive, over a network, from a partner, entity contact information relating to an entity, the entity contact information comprising an entity communication reference;
provide, over the network, to the partner, a connection provider communication reference different than the entity communication reference, the connection provider communication reference being associated with the partner and the entity;
receive, over the network, from a requester, a request for a communication connection, the request being initiated by the requester using the connection provider communication reference, wherein receiving the request includes receiving the request at a web server through redirection from the partner;
provide, over the network, a real-time communication connection between the requester and the entity, the communication connection being initiated using the entity communication reference;
charge the requester a requester fee responsive to the real-time communication being established;
pay the entity an entity service fee, the entity service fee comprising a first portion of the requester fee; and
pay the partner a partner service fee, the partner service fee comprising a second portion of the requester fee.

* * * * *